US012793125B2

(12) United States Patent
Crocker

(10) Patent No.: US 12,793,125 B2
(45) Date of Patent: Nov. 10, 2026

(54) SYSTEMS AND METHODS FOR DYNAMICALLY CURATING A MENU

(71) Applicant: WHATABURGER RESTAURANTS LLC, San Antonio, TX (US)

(72) Inventor: Austin Crocker, Boerne, TX (US)

(73) Assignee: WHATABURGER RESTAURANTS LLC, San Antonio, TX (US)

( * ) Notice: Subject to any disclaimer, the term of this patent is extended or adjusted under 35 U.S.C. 154(b) by 196 days.

(21) Appl. No.: 18/604,729

(22) Filed: Mar. 14, 2024

(65) Prior Publication Data

US 2025/0292311 A1 Sep. 18, 2025

(51) Int. Cl.
*G06Q 30/0601* (2023.01)
*G06F 3/0482* (2013.01)

(52) U.S. Cl.
CPC ....... *G06Q 30/0643* (2013.01); *G06F 3/0482* (2013.01); *G06Q 30/0621* (2013.01)

(58) Field of Classification Search
CPC ............ G06Q 30/0643; G06Q 30/0621; G06F 3/0482
See application file for complete search history.

(56) References Cited

U.S. PATENT DOCUMENTS 5,828,376 A * 10/1998 Solimene .............. G06F 3/0482 715/843
7,454,713 B2 * 11/2008 Spalink ............. H04M 1/72469 715/811
9,495,714 B2 * 11/2016 Bush ....................... G06Q 50/01
9,965,145 B2 * 5/2018 Baird ..................... G06F 3/0482
10,198,148 B2 * 2/2019 Shaw ..................... G06F 3/0488
10,332,193 B2 * 6/2019 Bahrami ............ G06Q 30/0241
10,958,968 B2 * 3/2021 Jarvis ................. H04N 21/2353
11,342,060 B2 * 5/2022 Laderman .............. G16H 20/60
11,368,587 B1 * 6/2022 Moreno .............. H04M 3/5166
11,477,286 B2 * 10/2022 Borza ................. G06F 3/04842
11,526,252 B2 * 12/2022 Arriola ................. G06F 3/0482
11,615,877 B2 * 3/2023 Laderman .......... G06Q 30/0207 705/2
11,831,807 B2 * 11/2023 Moreno .............. H04M 3/5191
12,131,394 B1 * 10/2024 Pokkunuri ............. G06N 20/00
12,355,916 B2 * 7/2025 Moreno .............. H04M 3/5166
2003/0004983 A1 * 1/2003 Cohen ................... G06F 3/0489 715/205

(Continued)

*Primary Examiner* — Oluseye Iwarere
(74) *Attorney, Agent, or Firm* — MARSHALL, GERSTEIN & BORUN LLP

(57) ABSTRACT

Systems and methods for dynamically curating a menu are disclosed herein. An example system includes one or more processors and a non-transitory computer-readable memory coupled to the processors. The memory may store a trained ML model and instructions thereon that, when executed by the one or more processors, cause the one or more processors to: receive categorical data associated with a user accessing a menu platform; generate, by the trained ML model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus; and transmit a control instruction causing a user computing device to display the curated menu for the user.

18 Claims, 10 Drawing Sheets

(56) References Cited

U.S. PATENT DOCUMENTS

| | | | | |
|---|---|---|---|---|
| 2007/0250794 | A1* | 10/2007 | Miura | G06F 3/0482 715/810 |
| 2012/0254801 | A1* | 10/2012 | Gaffney | G06F 8/38 715/825 |
| 2013/0268887 | A1* | 10/2013 | Roussos | G06Q 30/0241 715/810 |
| 2014/0172569 | A1* | 6/2014 | Banda | G06Q 30/02 705/14.55 |
| 2017/0031575 | A1* | 2/2017 | Dotan-Cohen | G06F 3/038 |
| 2019/0000382 | A1* | 1/2019 | Fitzpatrick | G16Z 99/00 |
| 2019/0187636 | A1* | 6/2019 | Fong | H04L 12/2803 |
| 2020/0065892 | A1* | 2/2020 | Brown | G06Q 30/0621 |
| 2020/0250783 | A1* | 8/2020 | Gnakou | G06K 7/1413 |
| 2021/0358593 | A1* | 11/2021 | Laderman | G06Q 30/0207 |
| 2022/0246279 | A1* | 8/2022 | Laderman | G06Q 30/0207 |
| 2022/0294905 | A1* | 9/2022 | Moreno | H04M 3/5166 |
| 2023/0042931 | A1* | 2/2023 | Haghighat Kashani | G06F 16/24578 |
| 2023/0170071 | A1* | 6/2023 | Dardashti | G16H 40/63 705/2 |
| 2024/0171679 | A1* | 5/2024 | Moreno | H04M 3/493 |

* cited by examiner

SYSTEMS AND METHODS FOR DYNAMICALLY CURATING A MENU

FIELD OF THE DISCLOSURE

The present disclosure generally relates to data analytics optimization, and more particularly, systems and methods for dynamically curating a menu for individual users.

BACKGROUND

Generally speaking, entities nearly ubiquitously evaluate consumer/user base trends through conventional data analytics to inform future decisions. Such conventional analytics often include determining consumer engagement with a product, item, or service provided by the entity based on datasets relating to a purchase frequency/volume and/or a purchase location. To increase the potential reliability of the resulting trends, entities frequently accumulate very large datasets representative of engagement during extensive time periods (e.g., months, years).

However, conventional data analytics techniques suffer from several notable drawbacks. For example, the datasets are typically insufficient to capture the trends of interest in real-time and/or with high fidelity or granularity, leading to skewed and/or otherwise erroneous future decisions based on such datasets. Moreover, the datasets are frequently large enough to require vast data storage infrastructure and significant computational capacity to process in an acceptable timeframe, and thereby further reduce the capability of these conventional techniques to provide real-time analytics.

Therefore, in general, accurately and quickly evaluating consumer/user engagement is an area of great interest, and conventional techniques are insufficient for providing such relevant, timely insights. Accordingly, a need exists for systems and methods for dynamically curating a menu that provide users with recommended menu items in a manner that alleviates these issues with conventional techniques.

SUMMARY

The embodiments herein provide solutions to the problems associated with conventional data analytics techniques. Broadly, the menu platform analyzes data associated with connected users and data associated with the menu items available on the platform to provide each individual user with a menu that is curated to their specific interests/preferences. User interaction with the available items and related data from other platforms may further influence the menu platform to update and/or otherwise adjust the curated menu for a user in real-time. Additionally, users may utilize the menu platform to create menu items and/or collections of items, which the menu platform may push to other connected users and/or further leverage to determine menu recommendations.

In doing so, the systems and methods of the present disclosure overcome the issues of conventional techniques by providing real-time data feedback and recommendations based on current, granular datasets in a manner that is not achievable using conventional techniques. For example, the menu platform of the present disclosure provides highly curated menus to individual users based on individual user data, as well as relevant group data, unlike conventional techniques that result in a single menu output to all users regardless of individual preferences. As a result, users have a greatly improved user experience as the selection and arrangement of menu items is automatically determined by the menu platform based on predicted and/or historical preferences, interests, and/or orders. These advantages improve over conventional systems at least because the resulting interface is improved by providing/displaying more relevant menu items than conventional interfaces.

Further, much of the individual user data (referenced herein as “categorical data”), may be stored locally and updated continuously on each user’s computing device, which dramatically reduces the storage resource issues conventional techniques experience when storing large, generic datasets in a central location. The embodiments of the present disclosure also reduce variational computational demand relative to conventional techniques. As previously mentioned, conventional techniques rely on large datasets that may be collected over long time periods. Conventional techniques often involve analyzing these datasets during dedicated times/periods, which may completely occupy valuable processing resources during those dedicated times/periods. However, the recommendations made by the menu platform of the present disclosure may occupy processing resources for relatively minimal amounts of time compared to conventional techniques, as such recommendations are based on frequently updated and/or intelligently condensed datasets. Accordingly, the embodiments of the present disclosure reduce data storage, reduce intensive computations, and optimize data analysis in a manner that is unobtainable using conventional techniques.

In an embodiment, the present invention is a system for dynamically curating a menu. The system comprising: one or more processors; and a non-transitory computer-readable memory coupled to the one or more processors storing a trained ML model and instructions thereon that, when executed by the one or more processors, cause the one or more processors to: receive categorical data associated with a user accessing a menu platform, generate, by the trained ML model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus, and transmit a control instruction causing a user computing device to display the curated menu for the user.

In a variation of this embodiment, the system, wherein the instructions, when executed, further cause the one or more processors to: receive, from a second user computing device, a customized menu item comprised of a set of ingredients from an ingredient list hosted on the menu platform, wherein the set of ingredients is in a specific sequence; generate, by the trained ML model, a list of predicted titles for the customized menu item based upon categorical data of a second user using the second user computing device and the set of ingredients; receive, a selected title for the customized menu item from the list of predicted titles; and upload, the customized menu item to the menu platform by: checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

In a variation of this embodiment, the system, wherein the instructions, when executed, further cause the one or more processors to: receive, the categorical data associated with the user accessing the menu platform; update, a condensed categorical dataset that is stored on the menu platform, wherein the condensed categorical dataset stores categorical data from a plurality of users in a smaller file size than a summation of individual file sizes of categorical data from the plurality of users; remove, the categorical data associated with the user from the menu platform; and update, the trained ML model based on the condensed categorical dataset.

In a variation of this embodiment, the system, wherein the user is a first user accessing the menu platform, the curated menu is a first curated menu, the user computing device is a first user computing device, and the instructions, when executed, further cause the one or more processors to: receive, categorical data associated with a second user accessing the menu platform; generate, by the trained ML model, a second curated menu, wherein the second curated menu is different from the first curated menu; and cause, a second user computing device to display the second curated menu for the second user.

In a variation of this embodiment, the system, wherein the curated menu is a preliminary curated menu, and the instructions, when executed, further cause the one or more processors to: receive subsequent categorical data associated with a user; generate, by executing the trained ML model, a subsequent curated menu for the user, wherein the subsequent curated menu is different from the preliminary curated menu; and cause the user computing device to display the subsequent curated menu for the user.

In a variation of this embodiment, the system, wherein the instructions, when executed, further cause the one or more processors to: receive menu item interaction data for each menu item uploaded to the menu platform; and update the trained ML model based on the menu item interaction data.

In a variation of this embodiment, the system, wherein the instructions, when executed, further cause the one or more processors to generate the curated menu for the user by: ranking, by executing the trained ML model, each menu item included as part of the curated menu based on (i) the categorical data and (ii) menu item interaction data corresponding to each menu item included as part of the curated menu.

In a variation of this embodiment, the system, wherein the instructions, when executed, further cause the one or more processors to: analyze, by executing the trained ML model, the categorical data of a user and one or more menu items uploaded to the menu platform to generate a new menu item to be included as part of the curated menu, the new menu item being different from each menu item uploaded to the menu platform.

In a variation of this embodiment, the system, wherein the categorical data includes: (i) a location of the user, (ii) one or more user preferences of other users accessing the menu platform, (iii) demographic data of the user, (iv) geographic data associated with the user, (v) user preferences determined by a survey, (vi) one or more previously purchased menu items of the user, (vii) a menu item created by the user.

In a variation of this embodiment, the system, wherein the instructions, when executed, further cause the one or more processors to: receive a plurality of customized menu items from a second user computing device arranged as a virtual menu, each customized menu item having a respective title, a respective sequence of ingredients, and each being created by a second user; generate, by executing the trained ML model, a list of predicted titles for the virtual menu based upon (i) the respective titles, (ii) the respective sets of ingredients and (iii) a second set of categorical data associated with the second user; receive a selected title for the virtual menu from the list of predicted titles; and upload the virtual menu to the menu platform by: checking that the selected title is not included as part of the list of predicted titles, and responsive to determining that the selected title is not included as part of the list of predicted titles, determining, by executing a natural language processing (NLP) model, whether the selected title satisfies a virtual menu title threshold.

In an embodiment, the present invention is a computer-implemented method for dynamically curating a menu. The method may comprise: receiving, by one or more processors, categorical data associated with a user accessing a menu platform; generating, by the one or more processors executing a trained machine learning (ML) model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus; and causing, by the one or more processors, a user computing device to display the curated menu for the user.

In a variation of this embodiment, the computer-implemented method may further comprise: receiving, at the one or more processors from a second user computing device, a customized menu item comprised of a set of ingredients from an ingredient list hosted on the menu platform, wherein the set of ingredients is in a specific sequence; generating, by the one or more processors executing the trained ML model, a list of predicted titles for the customized menu item based upon categorical data of a second user using the second user computing device and the set of ingredients; receiving, at the one or more processors, a selected title for the customized menu item from the list of predicted titles; and uploading, by the one or more processors, the customized menu item to the menu platform by: checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

In a variation of this embodiment, the computer-implemented method may further comprise: receiving, at the one or more processors, the categorical data associated with the user accessing the menu platform is received; updating, by the one or more processors, a condensed categorical dataset that is stored on the menu platform, wherein the condensed categorical dataset stores categorical data from a plurality of users in a smaller file size than a summation of individual file sizes of categorical data from the plurality of users; removing, by the one or more processors, the categorical data associated with the user from the menu platform; and updating, by the one or more processors, the trained ML model based on the condensed categorical dataset.

In a variation of this embodiment, the computer-implemented method, wherein the user is a first user accessing the menu platform, the curated menu is a first curated menu, the user computing device is a first user computing device, the method may further comprises: receiving, by the one or more processors, categorical data associated with a second user accessing the menu platform; generating, by the one or more processors executing the trained ML model, a second curated menu, wherein the second curated menu is different from the first curated menu; and causing, by the one or more processors, a second user computing device to display the second curated menu for the second user.

In a variation of this embodiment, the computer-implemented method, wherein the curated menu is a preliminary curated menu, and the method further comprises: receiving, at the one or more processors, subsequent categorical data associated with a user; generating, by the one or more processors executing the trained ML model, a subsequent curated menu for the user, wherein the subsequent curated menu is different from the preliminary curated menu; and causing, by the one or more processors, the user computing device to display the subsequent curated menu for the user.

In a variation of this embodiment, the computer-implemented method may further comprise: receiving, at the one or more processors, menu item interaction data for each menu item uploaded to the menu platform; updating, by the one or more processors, the trained ML model based on the menu item interaction data.

In a variation of this embodiment, the computer-implemented method, wherein generating the curated menu for the user comprises: ranking, by the trained ML model, each menu item included as part of the curated menu based on (i) the categorical data and (ii) menu item interaction data corresponding to each menu item included as part of the curated menu.

In a variation of this embodiment, the computer-implemented method may further comprise: analyzing, by the one or more processors executing the trained ML model, the categorical data of a user and one or more menu items uploaded to the menu platform to generate a new menu item to be included as part of the curated menu, the new menu item being different from each menu item uploaded to the menu platform.

In a variation of this embodiment, the computer-implemented method, wherein the categorical data includes: (i) a location of the user, (ii) one or more user preferences of other users accessing the menu platform, (iii) demographic data of the user, (iv) geographic data associated with the user, (v) user preferences determined by a survey, (vi) one or more previously purchased menu items of the user, (vii) a menu item created by the user.

In a variation of this embodiment, the computer-implemented method may further comprise: receiving, at the one or more processors, a plurality of customized menu items from a second user computing device arranged as a virtual menu, each customized menu item having a respective title, a respective sequence of ingredients, and each being created by a second user; generating, by the one or more processors executing the trained ML model, a list of predicted titles for the virtual menu based upon (i) the respective titles, (ii) the respective sets of ingredients and (iii) a second set of categorical data associated with the second user; receiving, at the one or more processors, a selected title for the virtual menu from the list of predicted titles; and uploading, by the one or more processors, the virtual menu to the menu platform by: checking that the selected title is not included as part of the list of predicted titles, and responsive to determining that the selected title is not included as part of the list of predicted titles, determining, by the one or more processors executing a natural language processing (NLP) model, whether the selected title satisfies a virtual menu title threshold.

In an embodiment, the present invention is a tangible, non-transitory computer-readable medium storing instructions for dynamically curating a menu. The instructions when executed by one or more processors cause the one or more processors to: receive, categorical data associated with a user accessing a menu platform; generate, by a trained ML model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus; and transmit a control instruction causing a user computing device to display the curated menu for the user.

In a variation of this embodiment, the tangible, non-transitory computer readable medium, wherein the instructions, when executed, further cause the one or more processors to: receive, from a second user computing device, a customized menu item comprised of a set of ingredients from an ingredient list hosted on the menu platform, wherein the set of ingredients is in a specific sequence; generate, by the trained ML model, a list of predicted titles for the customized menu item based upon categorical data of a second user using the second user computing device and the set of ingredients; receive, a selected title for the customized menu item from the list of predicted titles; and upload, the customized menu item to the menu platform by: checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

In a variation of this embodiment, the tangible, non-transitory computer readable medium, wherein the instructions, when executed, further cause the one or more processors to: receive, the categorical data associated with the user accessing the menu platform; update, a condensed categorical dataset that is stored on the menu platform, wherein the condensed categorical dataset stores categorical data from a plurality of users in a smaller file size than a summation of individual file sizes of categorical data from the plurality of users; remove, the categorical data associated with the user from the menu platform; and update, the trained ML model based on the condensed categorical dataset.

In a variation of this embodiment, the tangible, non-transitory computer readable medium, wherein the user is a first user accessing the menu platform, the curated menu is a first curated menu, the user computing device is a first user computing device, and the instructions, when executed, further cause the one or more processors to: receive, categorical data associated with a second user accessing the menu platform; generate, by the trained ML model, a second curated menu, wherein the second curated menu is different from the first curated menu; and cause, a second user computing device to display the second curated menu for the second user.

In a variation of this embodiment, the tangible, non-transitory computer readable medium, wherein the curated menu is a preliminary curated menu, and the instructions, when executed, further cause the one or more processors to: receive, subsequent categorical data associated with a user; generate, by the trained ML model, a subsequent curated menu for the user, wherein the subsequent curated menu is different from the preliminary curated menu; and cause, the user computing device to display the subsequent curated menu for the user.

In a variation of this embodiment, the tangible, non-transitory computer readable medium, wherein the instructions, when executed, further cause the one or more processors to: receive, menu item interaction data for each menu item uploaded to the menu platform; update, the trained ML model based on the menu item interaction data.

In a variation of this embodiment, the tangible, non-transitory computer readable medium, wherein generating the curated menu for the user, and the instructions, when executed, further cause the one or more processors to: rank, by the trained ML model, each menu item included as part of the curated menu based on (i) the categorical data and (ii) menu item interaction data corresponding to each menu item included as part of the curated menu.

In a variation of this embodiment, the tangible, non-transitory computer readable medium, wherein the instructions, when executed, further cause the one or more processors to: analyze, by the trained ML model, the categorical data of a user and one or more menu items uploaded to the menu platform to generate a new menu item to be included as part of the curated menu, the new menu item being different from each menu item uploaded to the menu platform.

In a variation of this embodiment, the tangible, non-transitory computer readable medium, wherein the categorical data includes: (i) a location of the user, (ii) one or more user preferences of other users accessing the menu platform, (iii) demographic data of the user, (iv) geographic data associated with the user, (v) user preferences determined by a survey, (vi) one or more previously purchased menu items of the user, (vii) a menu item created by the user.

In a variation of this embodiment, the tangible, non-transitory computer readable medium, wherein the instructions, when executed, further cause the one or more processors to: receive, a plurality of customized menu items from a second user computing device arranged as a virtual menu, each customized menu item having a respective title, a respective sequence of ingredients, and each being created by a second user; generate, by the trained ML model, a list of predicted titles for the virtual menu based upon (i) the respective titles, (ii) the respective sets of ingredients and (iii) a second set of categorical data associated with the second user; receive, a selected title for the virtual menu from the list of predicted titles; and upload, the virtual menu to the menu platform by: checking that the selected title is not included as part of the list of predicted titles, and responsive to determining that the selected title is not included as part of the list of predicted titles, determining, by the one or more processors executing a natural language processing (NLP) model, whether the selected title satisfies a virtual menu title threshold.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION OF THE INVENTION

Figure 1A:
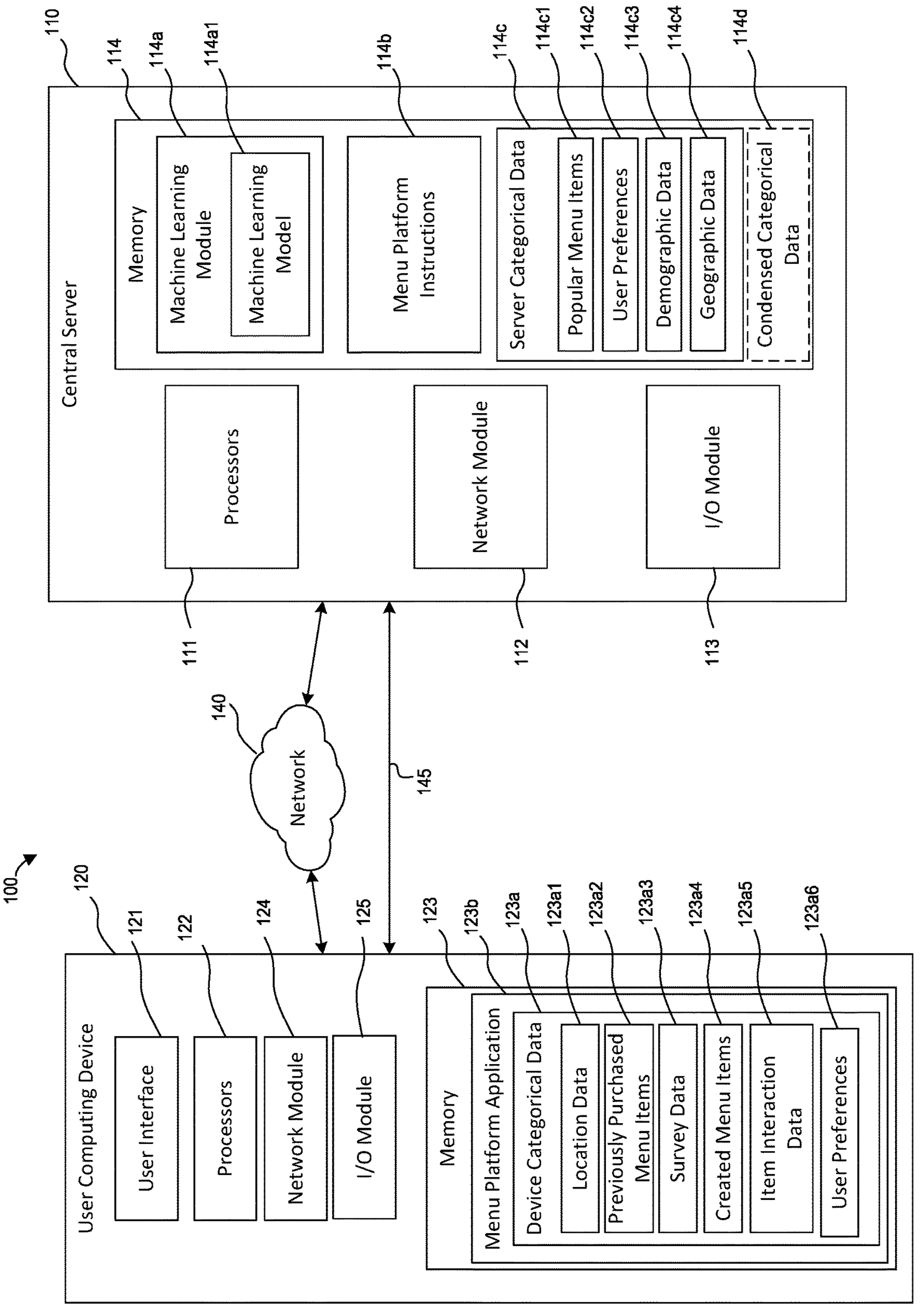
FIG. 1A illustrates an example computing environment for dynamically curating a menu, in accordance with various embodiments described herein.

In accordance with the above, and with the disclosure herein, the present disclosure includes improvements in computer functionality or in improvements to other technologies at least because the disclosure describes that, e.g., a hosting server (e.g., central server), or otherwise computing device (e.g., a user computing device), is improved where the intelligence or predictive ability of the hosting server or computing device is enhanced by a trained machine learning (ML) model. This model, executing on the hosting server or user computing device, is able to generate a curated menu accurately and efficiently for a user based upon real-time, granular data associated with the user. That is, the present disclosure describes improvements in the functioning of the computer itself or "any other technology or technical field" (e.g., the field of data analytics) because a hosting server or user computing device, is enhanced with a trained ML model to accurately detect, evaluate, and predict user preferences. The trained ML model then generates recommended items that are presented in an interface configured to improve a user's interactive efforts related to a virtual menu platform and associated devices. This improves over the prior art at least because existing systems lack such evaluative and/or predictive functionality and are generally unable to accurately analyze such user data on a real-time basis to output predictive and/or otherwise recommended items designed to improve a user's overall interactive efforts related to a virtual menu platform and associated devices. The embodiments described herein therefore provides improvements to the field of data analytics.

As mentioned, the model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., 10,000s of training data corresponding to user categorical data, uploaded menu items, user inputs, etc.) to output the relevant recommended items configured to improve the user interactive efforts related to a virtual menu platform and associated devices.

Moreover, the present disclosure includes effecting a transformation or reduction of a particular article to a different state or thing, e.g., transforming or reducing the storage requirements, processing demand, and recommended item relevancy of a central server and/or user computing devices from a non-optimal or error state to an optimal state by eliminating untimely/irrelevant user data, and thereby generating more accurate item recommendations.

Still further, the present disclosure includes specific features other than what is well-understood, routine, conventional activity in the field, or adding unconventional steps that demonstrate, in various embodiments, particular useful applications, e.g., receiving, by one or more processors, categorical data associated with a user accessing a menu platform; generating, by the one or more processors executing a trained machine learning (ML) model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus; and/or causing, by the one or more processors, a user computing device to display the curated menu for the user, among others.

FIG. 1A depicts an example computing environment 100 for dynamically curating a menu, in accordance with various embodiments described herein. Broadly speaking, the computing environment 100 may include components configured to communicate and/or otherwise facilitate communications corresponding to dynamic menu curation across a network 140 for users that may create menu items, request menu items, create virtual menus, provide feedback related to menu items, and/or otherwise interact within a menu platform hosted on a central server 110. The computing environment 100 may include the central server 110, a user computing device 120, the network 140, and/or a direct communication link 145 between the user computing device 120 and the central server 110.

The central server 110 may include one or more processors 111, a network module 112, an input/output (I/O) module 113, and a memory 114. The memory 114 may include a ML module 114*a*, menu platform instructions 114*b*, and server categorical data 114*c*. The ML module 114*a* may train and/or otherwise include a ML model 114*a*1. The server categorical data 114*c* may include popular menu items 114*c*1, user preferences 114*c*2, demographic data 114*c*3, and geographic data 114*c*4. The central server 110 may be a single server and, in certain embodiments, the central server 110 may be or include a collection of multiple servers (e.g., a server farm). As referenced herein, the menu platform instructions 114*b* may include and/or otherwise comprise computer-executable instructions configured to enable the central server 110 to run/host a "menu platform", to which various users may connect (e.g., through user computing devices 120) and upload menu items, upload virtual menus, receive curated menus/items, receive title recommendations, order menu items, and/or other similar functionalities or combinations thereof.

In any event, the memory 114 may store machine-readable instructions executable on the one or more processors 111. For example, as illustrated in FIG. 1A, the memory 114 stores the ML module 114*a*, which may comprise instructions configured to train and/or otherwise implement the ML model 114*a*1. Broadly speaking, the ML model 114*a*1 may be trained to receive various inputs (e.g., user categorical data) and generate various outputs (e.g., a curated menu, new menu items, predicted item/menu titles, menu/item rankings, etc.). In certain embodiments, the ML model 114*a*1 may be or include a single ML model or a plurality of suitable ML models configured to perform the various actions described herein.

The ML model 114*a*1 may be trained using any suitable ML techniques and may be or include any suitable models. For example, the ML model 114*a*1 may be or include association models, grouping models, and/or generative language models (e.g., ChatGPT) for use separately or in combination to generate the curated menus, menu items, menu item rankings, and/or other outputs described herein. These ML models may be and/or include frequent pattern growth learning models, association rules learning models, K-means clustering models, density based spatial clustering of applications with noise models, and/or any other relevant types of ML models or combinations thereof.

In some embodiments, the ML module 114*a* may train the ML model 114*a*1 to receive categorical data associated with a user accessing the menu platform (e.g., through menu platform application 123*b*) as input and to generate a curated menu for the user as output. The ML module 114*a* may more specifically train the ML model 114*a*1 using (i) a set of training categorical data from a plurality of users accessing the menu platform and (ii) a set of training menu items uploaded to the menu platform as inputs to output a set of training curated menus. The ML module 114*a* may analyze the training curated menus output by the ML model 114*a*1 during the training process to evaluate the accuracy of each training curated menu, and to adjust the ML model 114*a*1 accordingly. If, for example, a first training curated menu output by the ML model 114*a*1 includes a recommended menu item that is not known to correspond well with the training categorical data used as input to the ML model 114*a*1, the ML module 114*a* may adjust a weight and/or other parameter(s) of the ML model 114*a*1 to prevent such erroneous menu item recommendations in future iterations of the ML model 114*a*1.

For example, a first user may submit user categorical data through the menu platform application 123*b* that is used as input(s) to the ML model 114*a*1, which generates a curated menu for the first user as an output. The user categorical data may include data indicating that the first user prefers extra cheese and does not prefer mayonnaise. In this example, the curated menu for the first user may include four items that each include extra cheese and no mayonnaise. Three of these four menu items may be created by other users that connected to the menu platform and submitted the menu items, and one of the menu items may be a predetermined and/or otherwise known menu item that is stored as part of the menu platform instructions 114*b* and/or the server categorical data 114*c* (e.g., popular menu items 114*c*1).

In certain embodiments, these four items of the prior example may be ranked by the ML model 114*a*1 during creation of the curated menu. For example, the ML model 114*a*1 may determine that a first menu item created by a second user is the most likely to appeal to the first user based on correlations between the first user's categorical data, the ingredients of the first menu item, feedback associated with the first menu item, similarities between users who ordered the first menu item and the first user, and/or any other suitable data or combinations thereof. Regardless, the ML model 114*a*1 may rank the first menu item as the first item to appear in the curated menu displayed to the first user, and the ML model **114*a*1 may rank and thereby cause the second, third, and fourth menu items to be displayed in a similar manner as the first menu item. Accordingly, when the ML model 1143*a*1 generates the curated menu as an output, the one or more processors 111 may transmit a control instruction to the user computing device 120 of the first user that causes the device 120** to display the curated menu for the first user. When displayed, the first user may view the first menu item at the top or otherwise first position in the curated menu, the second menu item at the subsequent or otherwise second position in the curated menu, and so on.

Additionally, or alternatively, the ML module **114*a* may train and/or otherwise configure the ML model 114*a*1 to generate new menu items and/or new menu item recommendations. The ML module 114*a* may utilize some/all menu items currently and/or previously uploaded to the menu platform (e.g., as stored in the server categorical data 114*c*) as inputs to train the ML model 114*a*1 to generate a training new menu item and/or a training new menu item recommendation as an output. Further, the ML module 114*a* may train the ML model 114*a*1** using categorical data of users that have an account to access the menu platform, user feedback and/or other engagement with available and/or past menu items on the menu platform, and/or any other suitable data or combinations thereof.

For example, a first user may have a virtual menu hosted as part of the menu platform, and the first user may request a new menu item recommendation from the ML model **114*a*1 for potential inclusion as part of the first user's virtual menu. The ML model 114*a*1 may analyze each of the menu items currently included as part of the first user's virtual menu and/or the first user's categorical data and may generate a new menu item recommendation that is similar to the other menu items currently listed on the first user's virtual menu. In this example, assume that the first user's virtual menu focuses on breakfast items and the user's categorical data generally indicates the first user has a significant preference for breakfast items. Thus, when the ML model 114*a*1 evaluates the first user's virtual menu and the first user's categorical data, the ML model 114*a*1** may generate a new menu item recommendation for a breakfast item that includes a different set and/or sequence of ingredients from each menu item currently listed on the first user's virtual menu.

Alternatively, the ML model **114*a*1 may evaluate the user feedback corresponding to the first user's virtual menu, determine that a first and second menu items have received substantially more user feedback/engagement (e.g., positive ratings, actual orders, etc.) than the other menu items on the first user's virtual menu, and may generate a new menu item recommendation that includes a set and/or sequence of ingredients that is more similar to the first and/or second menu items than the other menu items to increase the likelihood of similarly positive user feedback/engagement for the new menu item. If the first user decides to accept the new menu item recommendation, the user may accept the recommendation, and the menu platform instructions 114*b* may cause the one or more processors 111** to create and upload the new menu item to the first user's virtual menu for access by other users.

Further, the ML model **114*a*1 may be trained and/or otherwise configured to evaluate and/or generate predicted menu item titles and/or predicted virtual menu titles. In certain embodiments, the ML model 114*a*1 may be or include any suitable natural language processing (NLP) model trained to evaluate user-created titles, e.g., for menu items and/or virtual menus, to determine if the titles meet a menu item threshold, virtual menu title threshold, etc. These thresholds may be a set of approved and/or otherwise allowable character strings (e.g., words, terms, phrases, etc.), a size limitation (e.g., maximum/minimum allowable length and/or storage size), and/or any other suitable threshold or combinations thereof that may be stored as part of the menu platform instructions 114*b* and/or the server categorical data 114*c***.

For example, a first user and a second user may both create menu items, and both users may submit their respective menu items with titles provided by the respective users. The first user may submit their menu item with a first title that includes no prohibited terms/phrases and that does not exceed the size limits of the menu platform. By contrast, the second user may submit their menu item with a second title that includes at least one prohibited term/phrase and that exceeds the size limits of the menu platform. Accordingly, the first user's menu item title may be approved and uploaded to the menu platform for satisfying the title threshold(s), while the second user's menu item title may be rejected for failing to satisfy the title threshold(s). The second user may also be required to submit an alternative title that satisfies the respective thresholds and/or to select one of the recommended titles generated by the ML model **114*a*1**, as described below.

Additionally, or alternatively, the ML model **114*a*1 may be or include a generative language model configured to output, for example, a list of titles for a menu, a menu item, and/or a virtual menu. The ML model 114*a*1 may generate these outputs based on an ingredient, a list of ingredients, a sequence of ingredients, and/or user categorical data associated with a user who created the items as inputs. For example, a user named Erin may create a menu item comprising ingredients commonly found in a cheeseburger, and those ingredients may be sequenced in a manner similarly consistent with a cheeseburger (e.g., bottom bun, beef patty, cheese slice, condiments, five pickles, top bun). When Erin submits the created menu item, the ML model 114*a*1** may generate a title "Erin's Cheeseburger" to reflect the user's name with a likely classification (e.g., cheeseburger) for the created menu item.

Moreover, the ML model **114*a*1 may also output any suitable title that satisfies the title thresholds. To illustrate, in the prior example, the ML model 114*a*1 may output an additional, different item title such as "Pickle Extravaganza" due to the relatively large number of pickles (five) the user (Erin) placed on the submitted menu item. Of course, it should be understood that the ML model 114*a*1 may generate a predicted title (or set of predicted titles) for a menu item based on any suitable data (e.g., user categorical data) and/or combinations thereof. As yet another example, the ML model 114*a*1** may output a recommended/predicted menu item title such as "The Southwest Special", in reference to the user's known geographical location (e.g., a city, state, or region of the Southwest of a country).

As still another example, a user may create a virtual menu with two or more user-created menu items, and the ML model **114*a*1 may output a virtual menu title of "User X's Virtual Menu", "The Burger Bin", "Chicken Sammies", and/or any other suitable title that satisfies the title thresholds and that may generally represent the menu items included in the virtual menu (e.g., all burgers, all chicken sandwiches, etc.). However, in certain instances, the titles generated for virtual menus and/or menu items may more generally reflect a type of user that may be most interested in the uploaded item(s). For example, the ML model 114*a*1** may generate a predicted menu title of "First Region House"

or "From the First Region" to represent a collection of menu items that each and/or mostly feature ingredients known to appeal to users in the first region.

As mentioned, the ML module 114*a* may train the ML model 114*a*1 using a supervised ML algorithm/technique, such as a neural network (e.g., a deep neural network (DNN), convolutional neural networks, combined learning module or program), an unsupervised ML algorithm/technique, and/or any other suitable ML technique(s) or combinations thereof. Generally, machine learning may involve identifying and recognizing patterns in existing data (such as trends in item selection for a user with certain characteristics) in order to facilitate making predictions or identification for subsequent data (such as using the model on new user features and content impression features in order to determine or identify a user trend corresponding to the new features). Additional ML model(s), such as the ML model 114*a*1 described herein for some aspects, may be created and trained based upon example data inputs or data (which may be termed "features" and "labels") in order to make valid and reliable predictions for new inputs, such as testing level or production level data or inputs.

In supervised machine learning, a ML program operating on a server, computing device, or otherwise processor(s), may be provided with example inputs (e.g., "features") and their associated, or observed, outputs (e.g., "labels") in order for the ML program or algorithm to determine or discover rules, relationships, patterns, or otherwise ML "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

For example, and in reference to FIG. 1A, the machine learning model 114*a*1 may be trained using user features, content impression features, and/or other features received from the user computing device 120, the central server 110, and/or otherwise stored in memory 114. The machine learning model 114*a*1 may receive such user features, content impression features, and/or other features in order to generate a curated menu, a menu item recommendation, a menu/item title recommendation, a new menu item recommendation, etc. Any of these outputs may then be used to update, re-train, and/or otherwise inform the machine learning model 114*a*1, thereby improving the accuracy of subsequent outputs by the machine learning model 114*a*1, for example, as the result of ingesting new user features, content impression features, and/or other features.

However, while described herein as being trained using a supervised learning technique (e.g., a neural network), in certain aspects, the machine learning model 114*a*1 may be trained using multiple supervised ML techniques and may additionally, or alternatively, be trained using one or more unsupervised ML techniques. In unsupervised ML, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

In other words, unlike supervised learning, unsupervised learning does not involve user-initiated training based upon example inputs with associated outputs. Rather, in unsupervised learning, the ML model 114*a*1 may organize unlabeled data according to a relationship determined by at least one machine learning method/algorithm employed by the ML model 114*a*1. Unorganized data may include any combination of data inputs and/or ML outputs as described herein.

In certain embodiments, the ML model 114*a*1 may employ a neural network, which may be a neural network, a deep learning neural network, and/or a combined learning module or program that learns in two or more features or feature datasets in particular areas of interest. For example, the ML programs/algorithms/techniques described herein may also include linear or logistic regression, instance-based algorithms, regularization algorithms, Bayesian networks, reinforced learning, dimensionality reduction, gradient boosting algorithms, Bayesian program learning, natural language understanding, automatic reasoning, support vector machine (SVM) analysis, decision tree analysis, random forest analysis, K-Nearest neighbor analysis, naïve Bayes analysis, clustering, reinforcement learning, and/or other ML programs/algorithms/techniques either individually or in combination.

The ML model 114*a*1 may also include natural language processing (NLP), which generally involves understanding verbal/written communications and generating responses to such communications. The ML model 114*a*1 may receive user inputs through the menu platform and may interpret, understand, and respond to such user inputs. For example, the ML model 114*a*1 may leverage techniques such as semantic analysis and syntactic analysis to understand and respond to user inputs.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (POS) tagging, parsing, lemmatization and stemming, stop-word removal, and/or any other suitable sub-task or combinations thereof. Using syntactic analysis, the machine learning model 114*a*1 may generate textual transcriptions from written responses from a user in a data stream. For example, a user accessing the menu platform may input an order for a menu item through verbal and/or written communication. The ML model 114*a*1 may receive that communication as input, and may proceed to utilize syntactic analysis to generate a transcription of the user's input.

Semantic analysis generally involves analyzing text in order to understand and/or otherwise capture the meaning of the text. In particular, the ML model 114*a*1 applying semantic analysis may study the meaning of each individual word contained in a textual transcription in a process known as lexical semantics. Using these individual meanings, the ML model 114*a*1 may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. Continuing the prior example, using semantic analysis, the ML model 114*a*1 may generate one or more intent interpretations (e.g., intended purchase of an indicated menu item) based upon the textual transcription of the user's input.

In some aspects, the artificial intelligence and/or ML based algorithms may be included as a library or package executed on the central server 110. For example, libraries may include the TENSORFLOW based library, the PYTORCH library, and/or the SCIKIT-LEARN Python library. Regardless, training the ML model **114*a*1** may also comprise retraining, relearning, or otherwise updating models with new, or different, information, which may include information received, ingested, generated, or otherwise used over time.

For example, the ML model **114*a*1 may be retrained over time with user viewing history information corresponding to outcomes of content pushed to the user that the user subsequently did or did not interact with (e.g., view, order, etc.). Thus, if outcome data stored as part of a user's viewing history indicates that the user viewed (or did not view) content transmitted to the user's computing device, then the ML model 114*a*1 may be updated and/or retrained with that outcome information/data (e.g., content impression features of the content) to change and/or otherwise modify weightings or other parametric configurations of the ML model 114*a*1** based on the outcome data.

In particular, the training dataset(s) may include as inputs/outputs a plurality of categorical datasets, a plurality of menu items, a plurality of training data corresponding to the categorical data, a plurality of training content impression updates, a plurality of training recommended menu items, a plurality of training menu item selections, a plurality of training sets of data corresponding to the curated menus, a plurality of menu/item title recommendations, and/or any other suitable data and combinations thereof. However, in certain embodiments, the ML model **114*a*1** may be a rules-based algorithm configured to receive user identification, categorical data corresponding to that user, and/or user viewing and interaction history as input and to output menu item recommendations, a curated list of menu items, title recommendations associated with a menu item/menu, and/or any other suitable output or combinations thereof.

In yet another embodiment, the ML model **114*a*1 may employ reinforcement learning, which involves optimizing outputs based upon feedback from a reward signal. Specifically, the ML model 114*a*1** may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also further be employed, including deep or combined learning techniques.

Further in reference to FIG. 1A, the server categorical data **114*c* may include popular menu items 114*c*1, which may be or include data corresponding to menu items included as part of the menu platform with which connected users frequently interact. For example, a first menu item may be included as part of the popular menu items 114*c*1** when the first menu item receives a certain threshold of user feedback/engagement (e.g., user likes, total orders, orders in a predefined period, feedback on social media platforms), and/or when the first menu item receives a relatively higher amount of feedback/engagement compared to other similar menu items (e.g., 15% higher orders than similar menu items).

The server categorical data **114*c*1 may also include user preferences 114*c*2 which may be or include data corresponding to preferences of one or more users that access the menu platform. For example, the user preferences 114*c*2** may include groupings of users that purchase similar items, groupings of users that answer survey questions similarly, groupings of menu items that certain groups/types of users may/may not prefer, and/or any other suitable preferences of the one or more users that access the menu platform.

The server categorical data **114*c*1 may also include demographic data 114*c*3 and geographic data 114*c*4 corresponding to the users that access the menu platform. The demographic data 114*c*3 may generally indicate similarities/differences of menu item order preferences, engagement actions, and/or other suitable actions between various demographics (e.g., age, ethnicity, sex) of users that access the menu platform. The geographic data 114*c*4** may include groupings of menu items that are popular/not popular in a particular area (e.g., city, county, parish, state, region, country, etc.), groupings of menu items that are similar to traditional menu items from a particular area (e.g., culturally relevant menu items), groupings of menu items containing an ingredient that is prevalent in a particular area, groupings of menu items that may become popular in a particular area (e.g., depending on a time of year or an significant cultural event).

Generally speaking, the data stored as part of the server categorical data **114*c* may be or include aggregate and/or otherwise representative data of the users that access the menu platform. However, it should be understood that the server categorical data 114*c* is not restricted to such aggregate data and/or the categories depicted in the figures. For example, the server categorical data 114*c* may also include individual menu item interaction data (e.g., 123*a*5), individual user preferences (e.g., 123*a*6), any of the other data stored as part of the device categorical data 123*a*, information retrieved from external background sources (e.g., social media) indicating menu item interaction, and/or any other suitable data may also be stored in the server categorical data 114*c***.

Moreover, the server categorical data **114*c* may generally be stored in the memory 114 of the central server 110. However, in certain embodiments, a portion or all of the server categorical data 114*c* may be stored on the user computing device 120. For example, the user computing device 120 may store all of the data for the individual user of the device 120 (e.g., device categorical data 123*a*) on the device 120, and the central server 110 may only receive and temporarily store the data from each individual user computing device 120 to generate the server categorical data 114*c***.

Further, in certain embodiments, the central server 110 may receive the some/all of the device categorical data **123*a* from the user computing device 120, update a condensed categorical dataset 114*d*, and remove the device categorical data 123*a* from the memory 114. In these embodiments, the condensed categorical dataset 114*d* may be a dataset that stores categorical data from a plurality of users (e.g., from respective user computing devices 120**) in a smaller file size than a summation of individual file sizes of the categorical data from the plurality of users.

For example, assume that a first user computing device stores device categorical data with a file size of 5 megabytes (MB) and a second user computing device stores device categorical data with a file size of 3 MB. The central server 110 may receive the device categorical data from each of the first and second user computing devices and proceed to update/create the condensed categorical dataset **114*d* by combining, embedding, statistically integrating, and/or otherwise incorporating the device categorical data from the first and second user computing devices in a manner that compresses/condenses the data into a new, updated condensed categorical dataset 114*d* without a loss of impact resulting from the individual device categorical data. Due to the compression/condensing, the updated categorical dataset 114***d* may have a file size that is smaller (e.g., 6 MB, 4 MB, etc.) than the 8 MB sum total (i.e., 5 MB+3 MB) required to store the raw device categorical data from the first and second user computing devices.

In this manner, the components of the computing environment 100 of FIG. 1A (e.g., central server 110) may improve the functioning of a computer by explicitly reducing the storage/memory resources required to perform the functions described herein. The condensed categorical dataset 114*d* requires less storage capacity than the component data (e.g., individual device categorical data) used for its creation while maintaining the information represented by the component data. The condensed categorical dataset 114*d* thereby enables the central server 110 to perform many of the functions described herein using fewer resources than conventional techniques without sacrificing accuracy.

In any event, the user computing device 120 may include a user interface 121, one or more processors 122, a network module 124, an I/O module 125, and a memory 123 storing computer readable instructions executable by the processor(s) 122. The memory may include device categorical data 123*a*, which may include location data 123*a*1, previously purchased menu items 123*a*2, survey data 123*a*3, created menu items 123*a*4, item interaction data 123*a*5, and user preferences 123*a*6. In some embodiments, the user interface 121 may be configured to display customized menu items, curated menus, virtual menus, and/or any other information described herein or combinations thereof. Moreover, the user computing device 120 may generally be any suitable device, such as a smartphone, smartwatch, smart glasses, cell phone, personal computer, and/or any other suitable device or combination thereof.

The device categorical data 123*a* may include location data 123*a*1, which may indicate a location of a user at a time the user accesses the menu platform and/or the previous locations of the user when the user accessed the menu platform. The previously purchased menu items 123*a*2 may be or include a list of menu items that the user has previously purchased on the menu platform. The survey data 123*a*3 may be or include answers the user has input in response to a series of questions on the menu platform when first accessing the menu platform. The created menu items 123*a*4 may be or include a list of customized menu items the user has created, if applicable. The item interaction data 123*a*5 may be or include information about the user's interaction with items hosted on the menu platform. In certain embodiments, the item interaction data 123*a*5 may include data extracted from external sources (e.g., social media) that reference a menu item from the menu platform. The user preferences 123*a*6 may be or include preferences of the individual user related to menu items, ingredients, virtual menus, item/menu titles, and/or other data hosted on and/or otherwise included as part of the menu platform.

More specifically, the item interaction data 123*a*5 may be or include information associated with menu items that a user has interacted with on the menu platform. This information may include menu items and/or virtual menus a user has viewed multiple times, items/menus a user has shared to a social media platform, items that a user has indicated that they like or dislike, and/or other similar data.

For example, the server categorical data 114*c* and the device categorical data 123*a* may indicate that a user is accessing the menu platform from a certain location that is different from the location where they typically access the menu platform. In this example, the user may frequently interact with menu items that share a certain attribute, such as particular ingredients or flavor profiles, and the user may also interact with menu items that are popular on the menu platform but share no attributes. The central server 110 may input this categorical data into the ML model 114*a*1 and the ML model 114*a*1 may output a curated menu (e.g., curated menus 171*a-n* of FIG. 2B) that may include popular menu items in the user's new location and popular menu items at the user's typical location. The curated menu 171*a-n* may further include menu items that feature the user's favored ingredients or flavor profiles that are popular in the user's new or typical location.

It should be appreciated that the device categorical data 123*a*, is not restricted to the categories depicted in the figures. For example, information retrieved from external background sources, one or more user preferences of other users accessing the platform that have similar categorical data, and/or any other relevant information to the menu platform may also be stored as part of the device categorical data 123*a*. Further, some/all of the device categorical data 123*a* may be stored on the user computing device 120 and/or the central server 110. As discussed herein, in certain embodiments, the device categorical data 123*a* may also be used to update the condensed categorical dataset 114*d* that is stored on the central server 110.

The processor(s) 111, 122 may include one or more general-purpose processors (e.g., CPUs), and/or special-purpose processing units (e.g., graphical processing units (GPUs)). The memories 114, 123 can be, optionally, a non-transitory memory and can include one or several suitable memory modules, such as random access memory (RAM), read-only memory (ROM), flash memory, other types of persistent memory, etc. The network modules 112, 124 may include one or more communication interfaces such as hardware, software, and/or firmware of an interface for enabling communications via a cellular network, a Wi-Fi network, any other suitable network such as a network 140, or a direct communication link 145, discussed below. The I/O modules 113, 125 may include I/O devices capable of receiving inputs from, and presenting outputs to, the ambient environment and/or a user. The I/O modules 113, 125 may include a touch screen, display, keyboard, mouse, buttons, keys, microphone, speaker, etc. In various implementations, the central server 110 and/or the user computing device 120 may include fewer components than illustrated in FIG. 1A or, conversely, additional components.

Of course, it will be appreciated that the example computing environment 100 is a representative example for the purposes of discussion herein. Various embodiments may include any suitable number and/or type of components, such as a plurality of user computing devices 120, a plurality of connected servers (e.g., central server 110), and/or the user computing device 120 and the central server 110 may themselves represent a plurality of devices/servers.

Figure 1B:
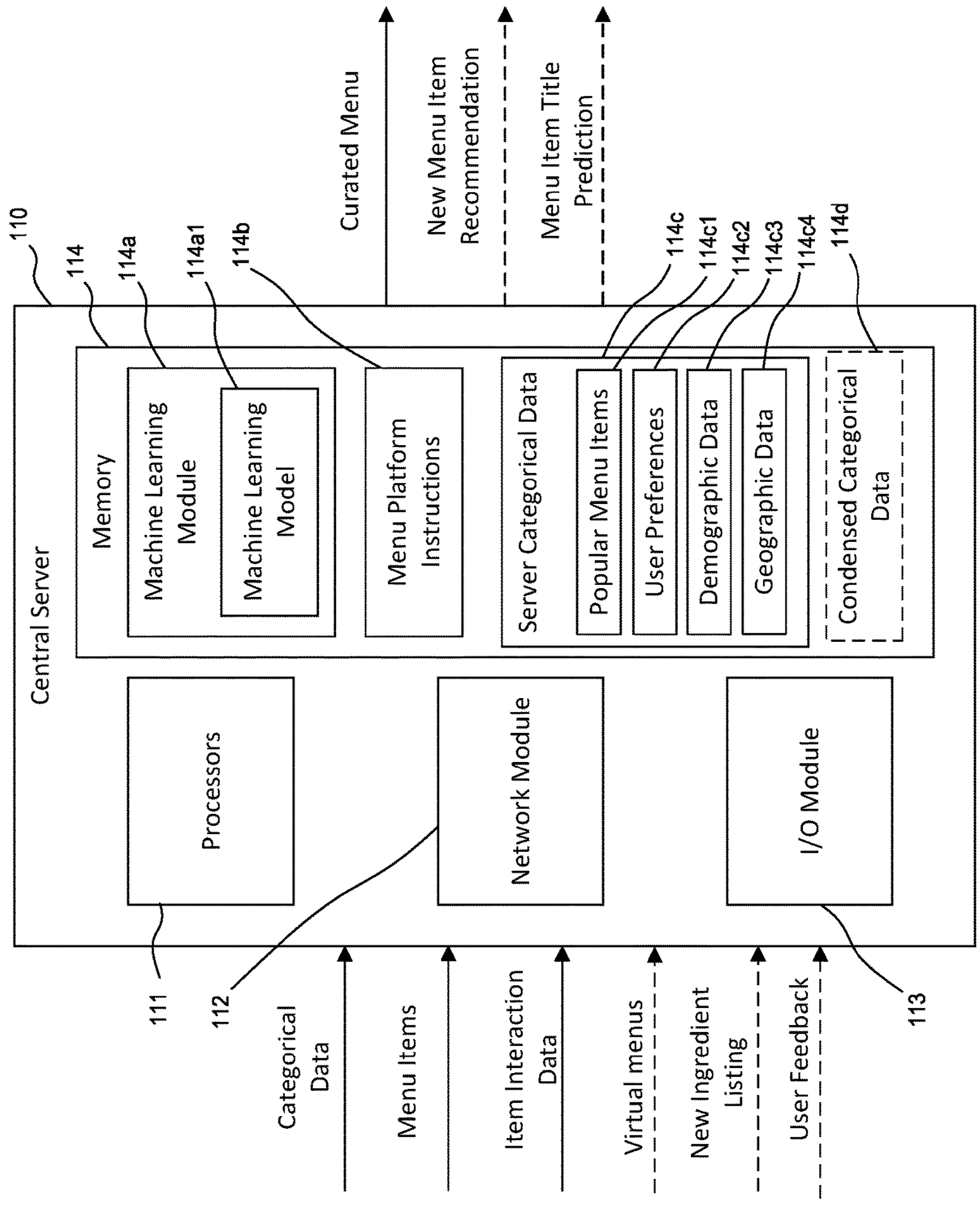
FIG. 1B illustrates example inputs and outputs for the central server from the example computing environment of FIG. 1A, in accordance with various embodiments described herein.

FIG. 1B depicts example inputs and outputs of the central server 110. Namely, as illustrated in FIG. 1B, the central server 110 may receive/access/retrieve categorical data associated with a user as input to output (e.g., via the ML model 114*a*1) a curated menu. The central server 110 may also utilize menu items as input as part of generating the curated menu and/or the central server 110 may receive/access/retrieve item interaction data as input as part of generating the curated menu. In certain embodiments, the central server 110 may receive/access/retrieve virtual menus as input to push and/or otherwise make the virtual menus available to users accessing the menu platform.

Further, the central server 110 may also receive/access/retrieve new ingredients as input to provide more options for customized menu items, customized menus, etc. Additionally, the central server 110 (e.g., via ML model 114*a*1) may output a new menu item that is not currently (or previously) available on the menu platform based upon the categorical data associated with a user, the item interaction data, and/or any other suitable data. The central server 110 (e.g., via ML model 114*a*1) may also output titles for customized menu items or virtual menus based upon categorical data associated with a user, an individual customized menu item, the collected customized menu items included in a virtual menu, and/or any other suitable data.

Moreover, the central server 110 may receive user feedback and may utilize the feedback to re-train, update, and/or otherwise adjust the ML model 114*a*1 and/or to adjust any of the data output by the central server 110. For example, the central server 110 may output a new menu item recommendation that the user receiving the recommendation does not prefer. Accordingly, the user may provide feedback indicating the user's disinterest in the new menu item, and the central server 110 may update/re-train the ML model 114*a*1 to avoid producing similarly erroneous outputs during future iterations, and/or the central server 110 may adjust the new menu item recommendation to more accurately suit the user's preferences based on the feedback.

Figure 2A:
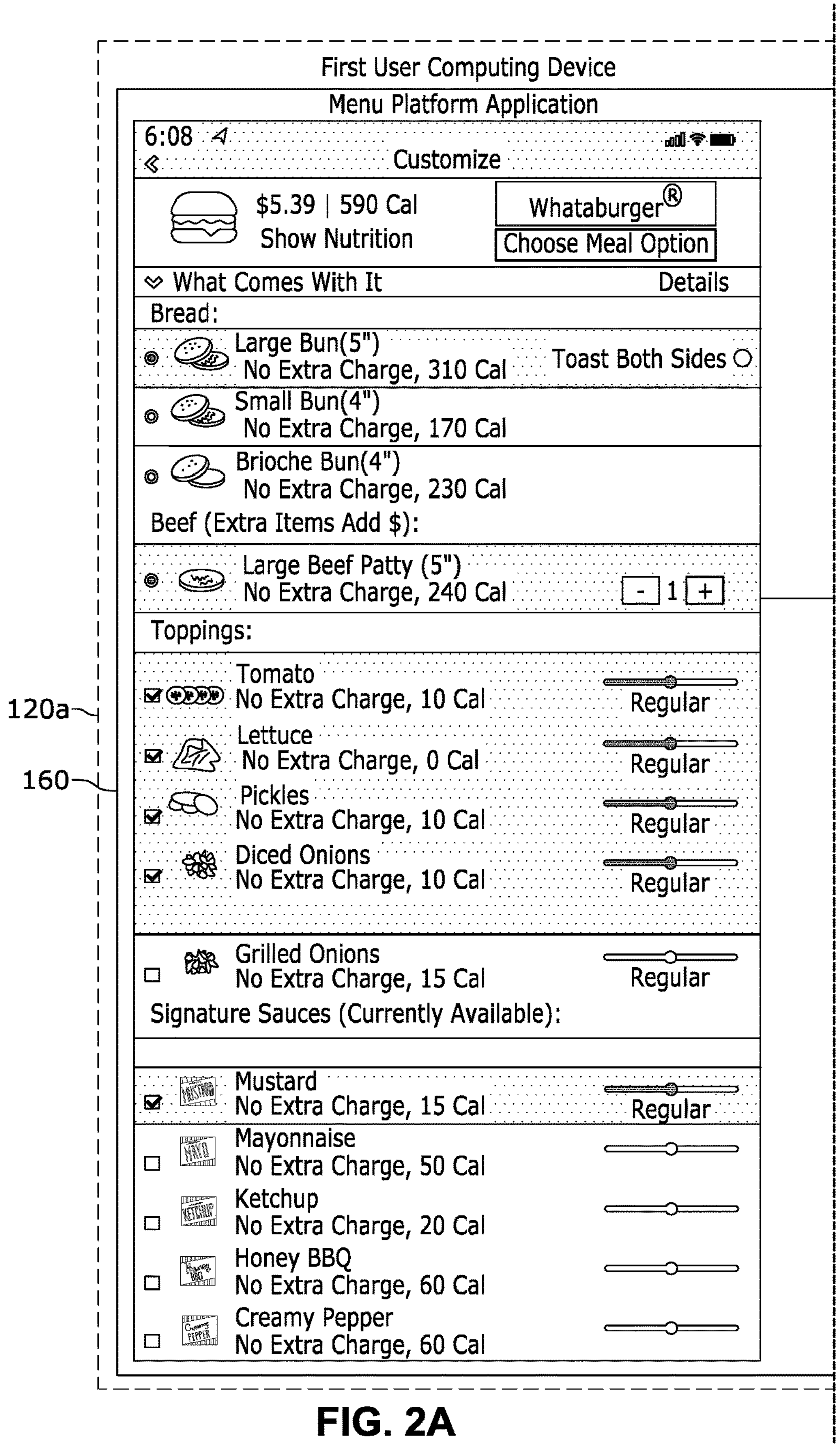
FIG. 2A illustrates an example customized menu item creation sequence and subsequent curated menu recommendations to connected users, in accordance with various embodiments described herein.
Figure 2A:
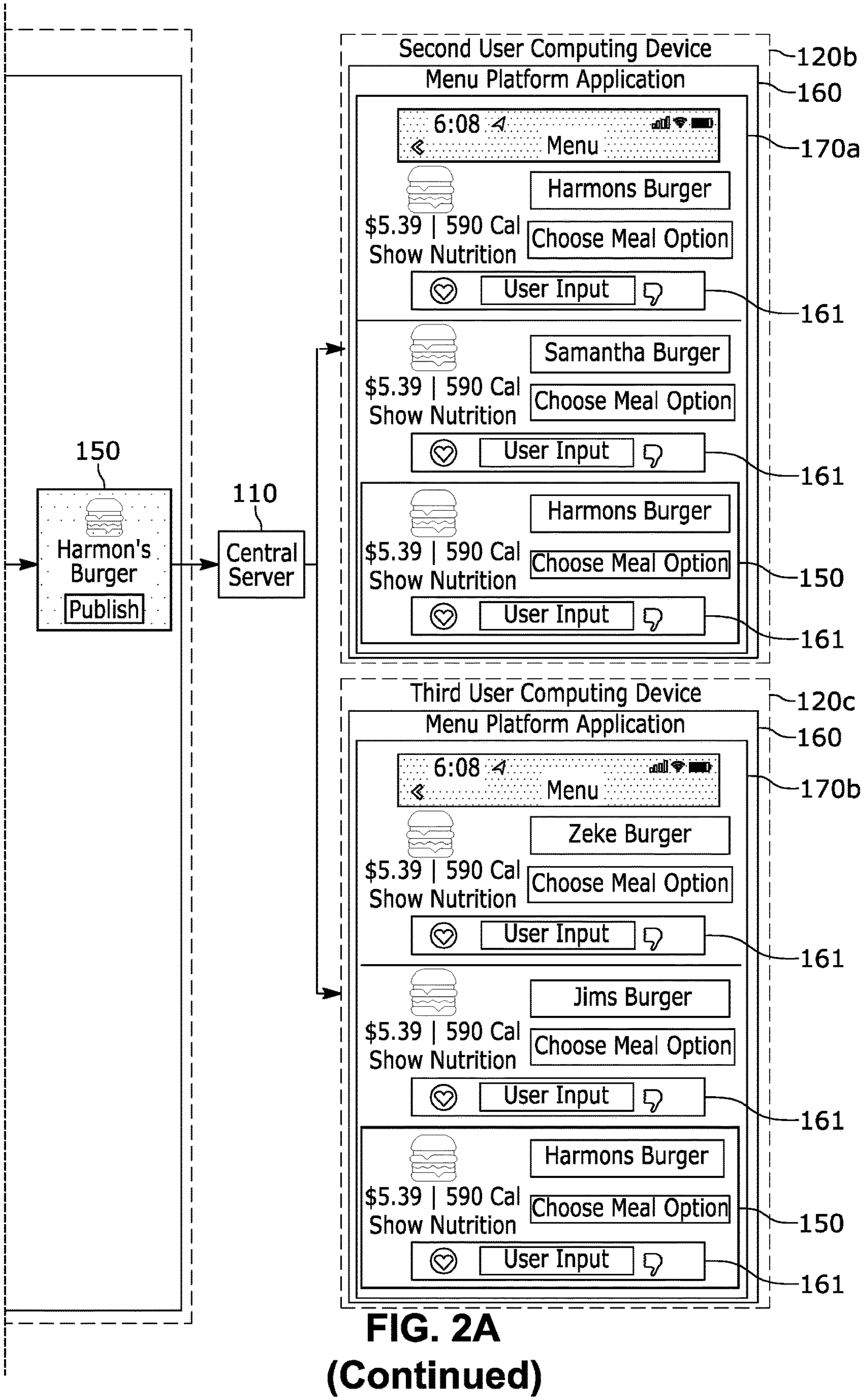

FIG. 2A depicts an example of a user creating a customized menu item 150 and publishing it to the menu platform through a menu platform application 160, in accordance with the embodiments herein. A first user may create the customized menu item 150 on the menu platform application 160, as executed on the first user computing device 120*a*, and the user may push the customized menu item 150 to the central server 110 for subsequent evaluation/pushing to other users. For example, the first user may select individual ingredients in a list, as illustrated in the menu platform application 160, to create the customized menu item 150. When the first user is satisfied with the selected ingredients, the first user may interact with a publish button included as part of the customized menu item 150 to upload/push the customized menu item 150 to the central server 110.

In some embodiments, a user may create a customized menu item (e.g., customized menu item 150) by placing the ingredients in the ingredient list in a particular sequence. This sequence of ingredients may then be stored in memory (e.g., memory 114, 123) along with the menu item title, feedback/engagement corresponding to the menu item, and/or any other suitable data or combinations thereof. For example, a first user and a second user may both create a hamburger using a beef patty, a large bun, tomato, pickles, lettuce, and mustard. However, the first user may construct their hamburger by placing those ingredients in a different sequence than the second user, such that the two hamburgers would still constitute two distinct customized menu items although they both contain the same set of ingredients. To illustrate, the first user may create their hamburger by placing (in order from the bottom up): bottom bun, lettuce, tomato, beef patty, pickles, mustard, and top bun; while the second user may create their hamburger by placing (in order from bottom up): top bun, beef patty, mustard, lettuce, tomato, pickles, and bottom bun. Accordingly, the central server 110 may determine that any customized menu item that includes a different set and/or sequence of ingredients may comprise a unique customized menu item for uploading on the menu platform.

When the central server 110 receives the customized menu item 150, the central server 110 may proceed to analyze/evaluate the customized menu item 150, as described herein. For example, the central server 110 may check that any provided title for the customized menu item 150 satisfies the established thresholds/rules, the server 110 may execute a ML model (e.g., ML model 114*a*1) to generate a predicted/recommended menu item title for the customized menu item. After the central server 110 evaluates the customized menu item 150, the central server 110 may push the customized menu item 150 to the respective user computing devices 120*b* and 120*c* for display on the menu sections 170*a*, 170*b* of the menu platform application 160.

As displayed on the menu platform applications 160 rendered on the respective user computing devices 120*b*, 120*c*, the customized menu item 150 may include a user input section 161 that allows the user to indicate their interaction experience with the customized menu item 150 in various manners. For example, the user input section 161 may allow users to indicate that the user ordered a particular menu item (e.g., customize menu item 150), liked/loved/disliked a particular menu item, and/or may allow the user to provide written feedback regarding their experience with the particular menu item or other suitable forms of interaction.

It should be appreciated that the two user computing devices 120*b* and 120*c* illustrated in FIG. 2A are for the purposes of clarity only. The central server 110 may push the customized menu item 150 to any number of user computing devices 120.

Figure 2B:
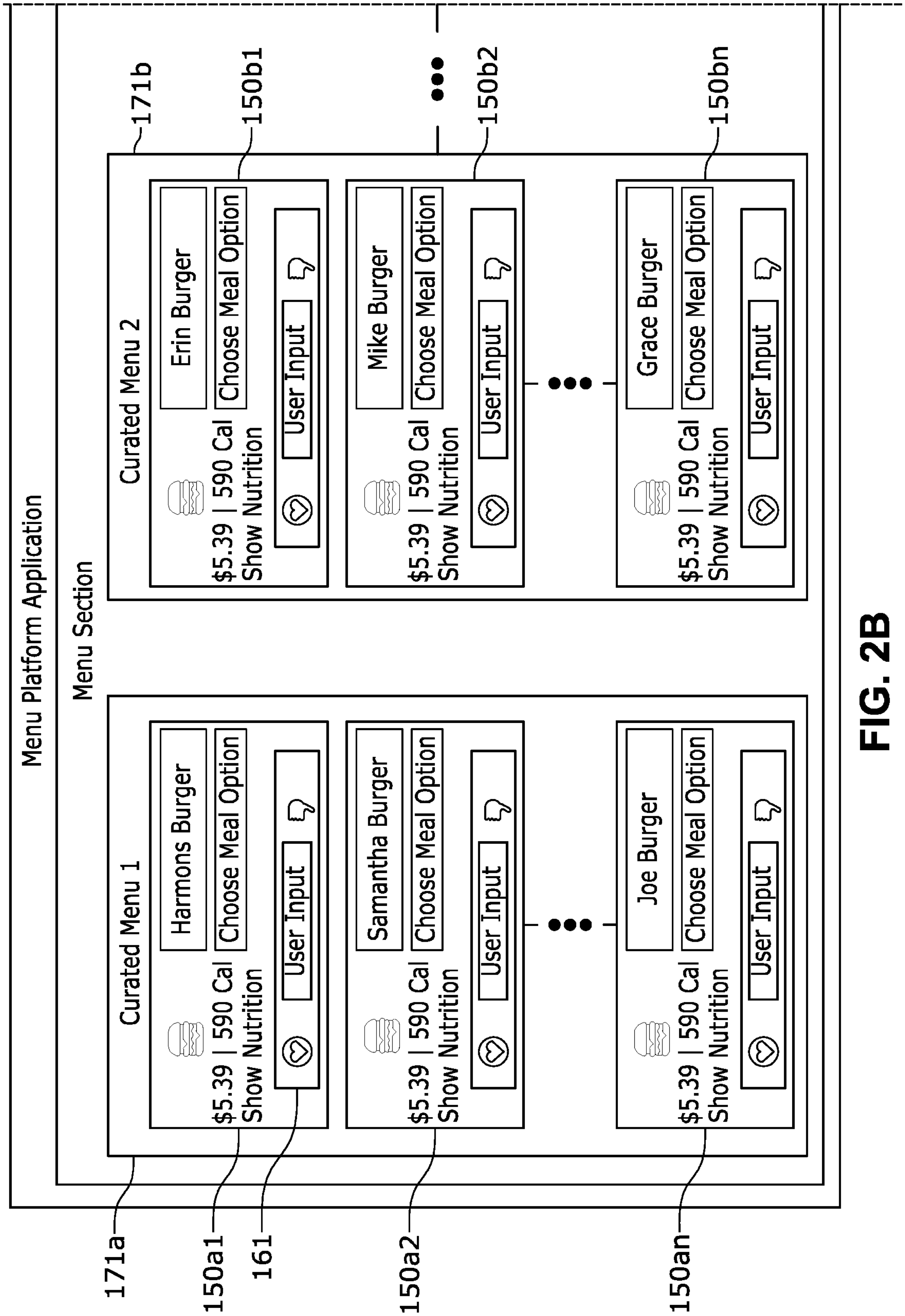
FIG. 2B illustrates an example menu display for various customized menu items, in accordance with various embodiments described herein.
Figure 2B:
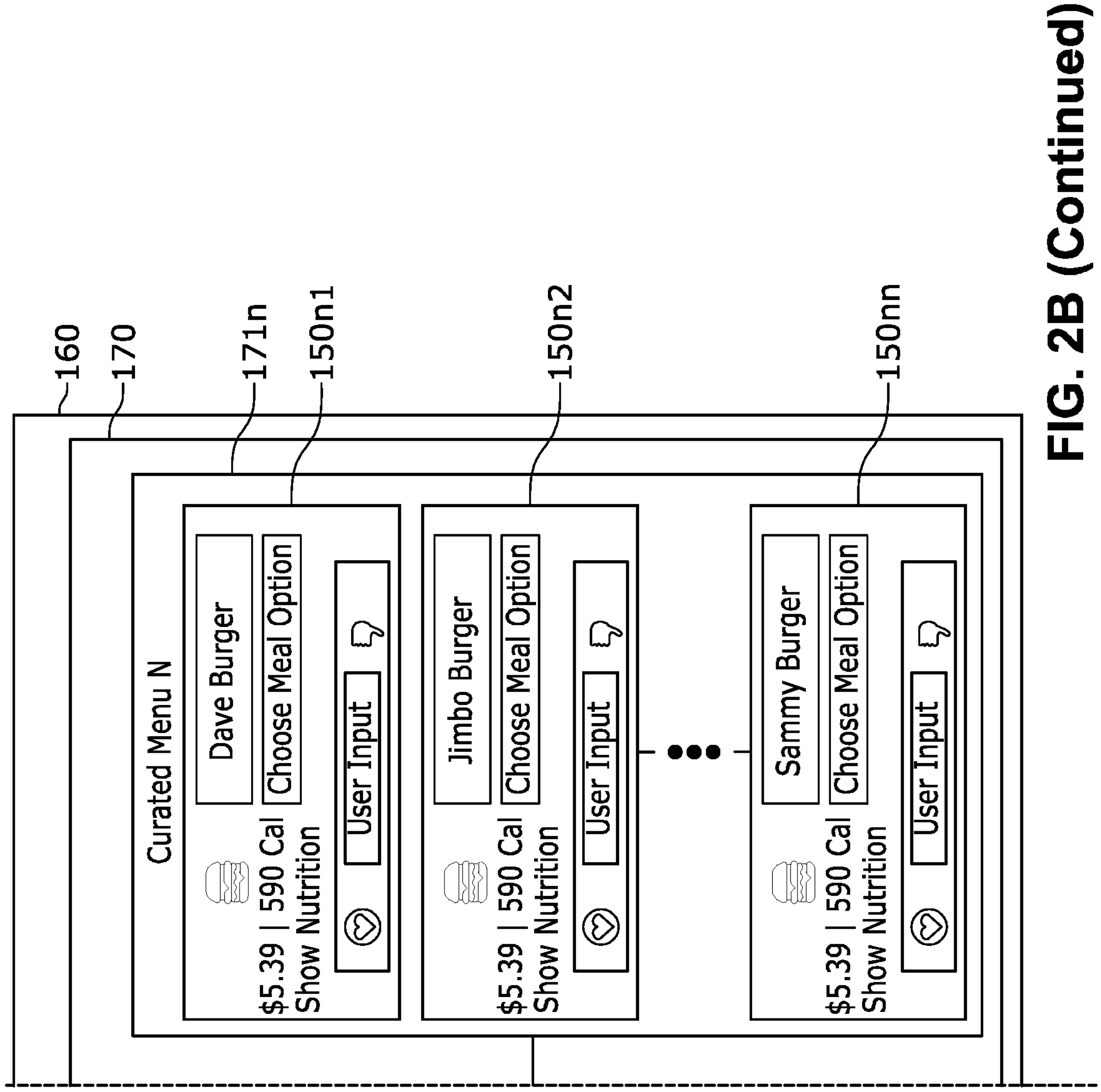

FIG. 2B depicts an example menu section 170 within the menu platform application 160 displaying various customized menu items created by various users on the menu platform, in accordance with various embodiments described herein. The menu section 170 may include various curated menus 171*a*-171*n* that may each include any suitable number, type, and/or organization/ranking of menu items, as described herein.

The curated menus 171*a*-171*n* may include various customized menu items 150*a*1-150*an*, 150*b*1-150*bn*, and 150*n*1-150*nn* respectively. Each customized menu item 150*a*1-150*an*, 150*b*1-150*bn*, 150*n*1-150*nn* may include a user input section 161 that allows the user to indicate their interaction experience with the customized menu item 150*a*1-150*an*, 150*b*1-150*bn*, 150*n*1-150*nn*. As described herein, each curated menu 171*a-n* may include a curated selection of customized menu items 150*a*1-150*an*, 150*b*1-150*bn*, 150*n*1-150*nn* (and/or predetermined menu items) that may correlate to one or more specific components of the user's categorical data. For example, the first curated menu 171*a* may include menu items specifically intended to appeal to the user based on the user's geographic data (e.g., geographic data 114*c*4), the second curated menu 171*b* may include menu items specifically intended to appeal to the user's preferences (e.g., user preferences 123*a*6 or 114*c*2), and the third curated menu 171*n* may include menu items specifically intended to appeal to the user based on the most popular menu items (e.g., popular menu items 114*c*1).

In certain embodiments, the customized menu items 150*a*1-150*an*, 150*b*1-150*bn*, 150*n*1-150*nn* displayed in a curated menu 171 may be ranked by a ML model (e.g., ML model 114*a*1). The ML model may place customized menu items 150 in the ranked list based on, for example, which menu items the ML model determines are most likely of interest to a user. For example, the second curated menu 171*b* may be ranked as a result of the ML model generating rankings as part of the evaluation of the inputs used to output the second curated menu 171*b*. Thus, the ML model may determine that the first menu item 150*b*1 is likely of most interest to the user, the second menu item 150*b*2 is the second most likely item of interest to the user, and so on, until the ML model determines that the last menu item **150*bn* is the least likely item of interest to the user that is included as part of the second curated menu 171*b***.

In some embodiments, the ML model (e.g., ML model **114*a*1) may generate a new menu item for a user accessing the menu platform through the menu platform application 160 to supplement the customized menu items 150*a*1-150*an*, 150*b*1-150*bn*, 150*n*1-150*nn* included in the curated menus 171*a-n* of the menu section 170. The ML model may generate a new menu item upon prompting from the user, and/or independently based on the central server (e.g., central server 110) recognizing certain trends. For example, the ML model may generate the new menu item if the central server identifies unique trends in the user's interaction tendencies and the customized menu items 150*a*1-150*an*, 150*b*1-150*bn*, 150*n*1-150*nn* currently available on the menu platform application 160** are deemed to be insufficient and/or substantially redundant by the user, the central server, and/or another suitable component. To illustrate, a user may consistently not order and/or engage with curated menus/menu items recommended by the ML model, and the user may provide feedback indicating that the recommendations consistently lack a particular ingredient or flavor profile that is of interest to the user. Accordingly, the ML model may proceed to generate a new menu item that incorporates the particular ingredient or flavor profile and/or otherwise may more likely appeal to the user that is not currently available on the menu platform.

It should be understood that the number and display configuration of curated menus **171*a-n* and customized menu items 150*a*1-150*an*, 150*b*1-150*bn*, 150*n*1-150*nn* illustrated in FIG. 2B is for the purposes of discussion only. The curated menus 171*a-n* and customized menu items 150*a*1-150*an*, 150*b*1-150*bn*, 150*n*1-150*nn*** may be of any suitable number and/or displayed in any suitable configuration.

Figure 2C:
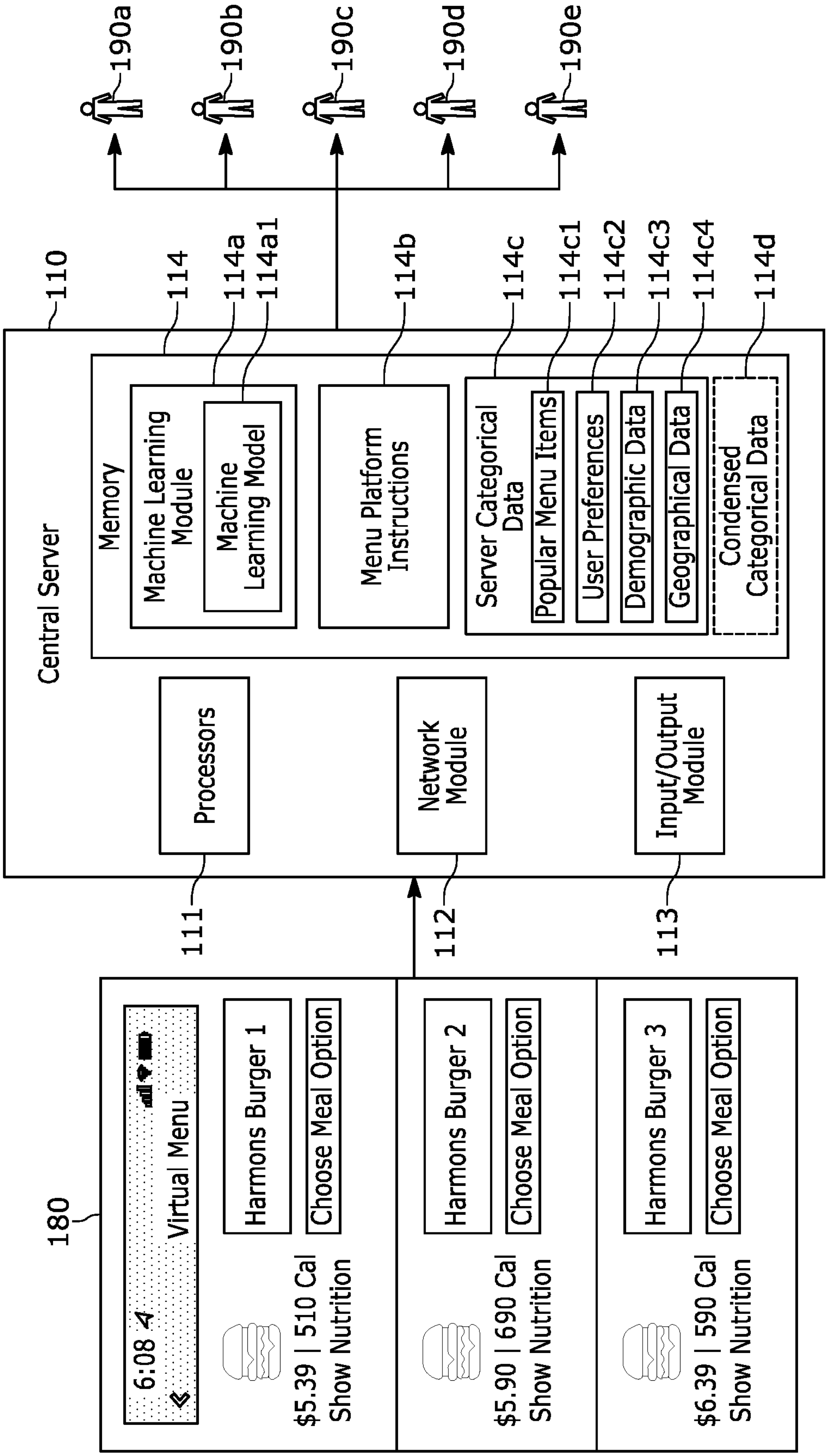
FIG. 2C illustrates an example virtual menu dissemination sequence to various users through the menu platform, in accordance with various embodiments described herein.

FIG. 2C depicts an example publishing by the central server 110 of a user's virtual menu 180 to connected users **190*a-e*. Namely, a user who has constructed and/or otherwise approved of the virtual menu 180 may approve submission of the virtual menu 180 to the central server 110, such that the user computing device (e.g., user computing device 120) may transmit the virtual menu 180 to the central server 110 using the menu platform application (e.g., menu platform application 160). The central server 110 may thereafter receive the virtual menu 180, process the virtual menu 108, and may subsequently transmit/push the virtual menu 180 to other users 190*a*-190*e*** accessing the menu platform.

For example, and as discussed herein, the central server 110 may process and/or otherwise evaluate the virtual menu 180 by checking that any provided title for the virtual menu 180 and/or the menu items included therein satisfy the established thresholds/rules corresponding to such titles. If, as an example, the virtual menu 180 is uploaded without a title and/or the user requests a title recommendation from the central server 110, the server 110 may execute the ML model **114*a*1 to generate a predicted/recommended virtual menu title for the virtual menu 180. Regardless, after the central server 110 evaluates the virtual menu 180 and determines that the menu 180 and corresponding menu items satisfy the corresponding thresholds/rules, the central server 110 may push the virtual menu 180 to the respective user computing devices of users 190*a-e*** for display on the menu platform application.

Further, the ML model **114*a*1 may generate a list of titles for the virtual menu 180 based upon any suitable data, such as the respective titles of the customized menu items, the respective sets of ingredients of the customized menu items, the categorical data associated with the user who arranged the virtual menu 180 and/or created the customized menu items, and/or any other suitable data. When the ML model 114*a*1 generates and outputs the list of recommended titles, the user may select a title from the list of recommended titles for the virtual menu 180 or create a new title. If the user submits their own new title, the ML model 114*a*1** may evaluate the new title using a NLP model to determine whether the title satisfies the virtual menu title thresholds, as described herein.

For example, the virtual menu 180 may not include a title and may include a set of customized menu items that each include a higher-than-average number of beef patties. The ML model **114*a*1 may determine that each customized menu item includes such a relatively high number of beef patties by comparing the number of beef patties of each customized menu item and/or the average number of beef patties of the customized menu items comprising the virtual menu 180 with the average number of beef patties of some/all customized (or non-customized) menu items uploaded to the menu platform (e.g., included in the server categorical data 114*c*). The ML model 114*a*1 may then output a recommended title of "Beef Party", "Here's The Beef", and/or other similar titles specifically referencing the higher-than-average beep patty content of the customized menu items featured on the virtual menu 180. Additionally, or alternatively, the ML model 114*a*1 may output recommended titles based on titles of other virtual menus and/or customized menu items that have received substantial positive user feedback/engagement (e.g., based on the popular menu items 114*c*1**).

It should be understood that the users **190*a*-190*e* depicted in FIG. 2C are illustrated as five other users for the purposes of discussion only. Any suitable number of users may connect to the menu platform, such that the central server 110 may push/publish the virtual menu 180 to any suitable number of connected users. Further, virtual menus described herein are not limited to the specific configuration illustrated in FIG. 2**C. Virtual menus may include any suitable number of menu items, menu sections, and/or may be organized and/or displayed in any suitable manner.

Figure 3:
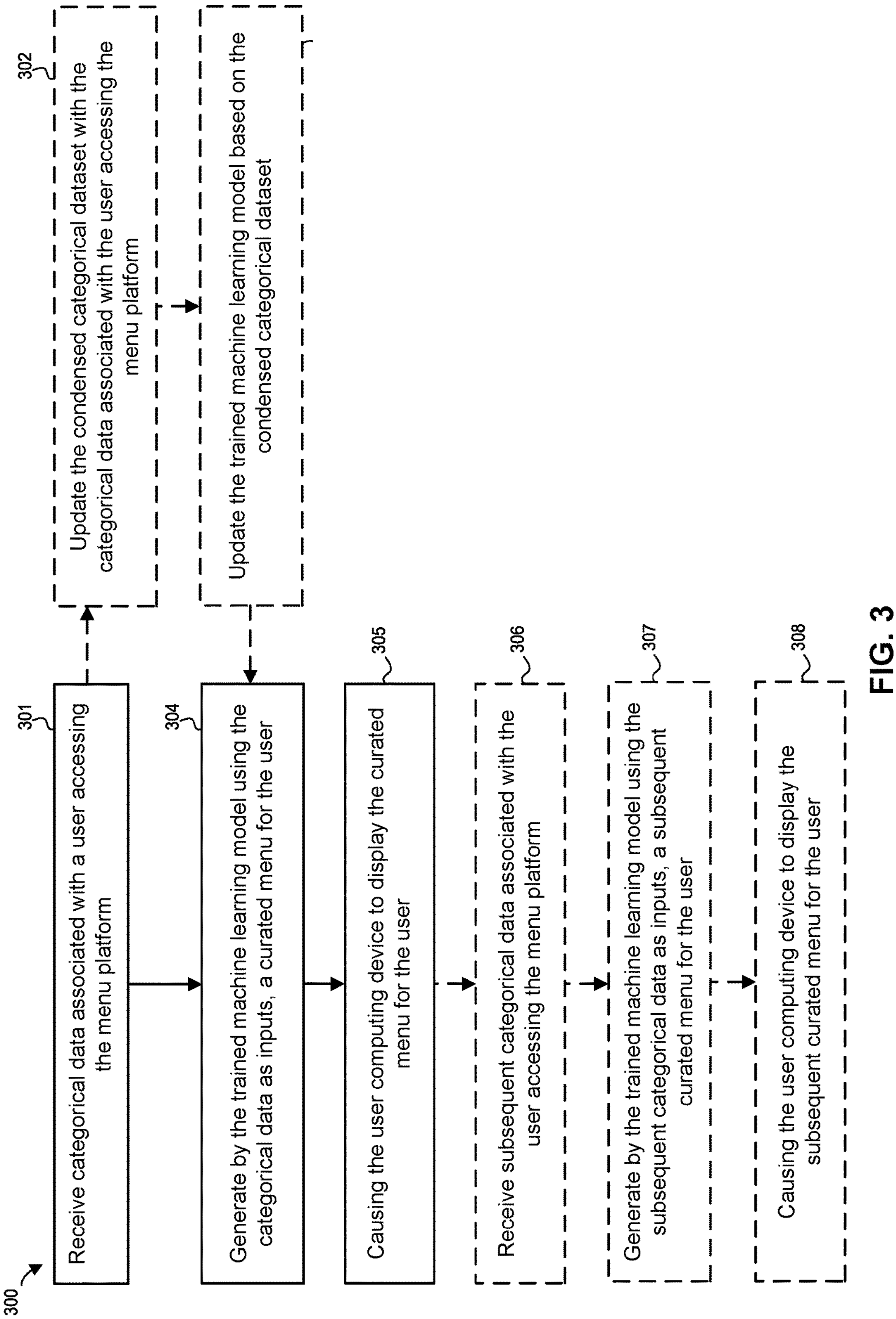
FIG. 3 illustrates an example method for dynamically curating menus for a user, in accordance with various embodiments described herein.

FIG. 3 illustrates an example method 300 for disseminating curated menus to a user, in accordance with various embodiments described herein. At least portions of the method 300 may be performed by one or more processors (e.g., processors 111, 122) utilizing the embodiments of the central server 110 and/or the user computing device 120 of FIG. 1A, for example, and/or by any other suitable modules or systems, as described herein.

At block 301, the method 300 includes receiving categorical data associated with a user accessing the menu platform. The method 300 further includes generating a curated menu for the user by executing a trained ML model using the categorical data as inputs (block 304). The method 300 further includes causing a user computing device to display the curated menu for the user (block 305).

As illustrated in FIG. 3, the method 300 may optionally include updating a condensed categorical dataset with the categorical data associated with the user accessing the menu platform (block 302). In these embodiments, the condensed categorical dataset may be stored on the menu platform, and/or the condensed categorical dataset may store categorical data from a plurality of users in a smaller file size than a summation of individual file sizes of categorical data from the plurality of users. The method 300 may further include removing the categorical data associated with the user from the menu platform when the categorical data is included and/or otherwise utilized to update the condensed categorical dataset. The method 300 may further include updating the trained ML model based on the condensed categorical dataset (block 303).

As illustrated in FIG. 3, and in some embodiments, the curated menu is a preliminary curated menu, and the method 300 may further include receiving subsequent categorical data associated with the user (block 306). The method 300 may further include generating, by executing the trained machine learning model, a subsequent curated menu by using the subsequent categorical data as inputs (block 307). In these embodiments, the subsequent curated menu is different from the preliminary curated menu. The method 300 may further include displaying the subsequent curated menu on the user's computing device (block 308).

In certain embodiments, the user is a first user, the curated menu is a first curated menu, and the user computing device is a first user computing device. The method 300 may further comprise receiving categorical data associated with a second user accessing the menu platform. A trained ML model using the categorical data associated with the second user as inputs may generate a second curated menu, wherein the second curated menu is different from the first curated menu. The method 300 may further include displaying the second curated menu on the second user's computing device.

In some embodiments, the method 300 may further comprise receiving menu item interaction data for each menu item uploaded to the menu platform, and updating the ML model based on the menu item interaction data. In certain embodiments, the method 300 may further include generating the curated menu by ranking each menu item included in the curated menu using the ML model. The method 300 may further include the ML model performing such ranking based upon the categorical data associated with the user and/or the menu item interaction data for each menu item included in the curated menu.

In certain embodiments, the method 300 may further comprise analyzing the categorical data and one or more menu items uploaded to the menu platform to generate a new menu item for recommendation to a user by including the new menu item in the curated menu. The new menu item may be different from each menu item uploaded to the menu platform.

In some embodiments, the categorical data referenced in the method 300 may include a location of the user, item interaction data of the user, the user's preferences based upon a survey, one or more menu items the user has previously purchased, demographic data about the user, menu items the user has created, and/or one or more user preferences of other users accessing the platform that have similar categorical data.

Figure 4:
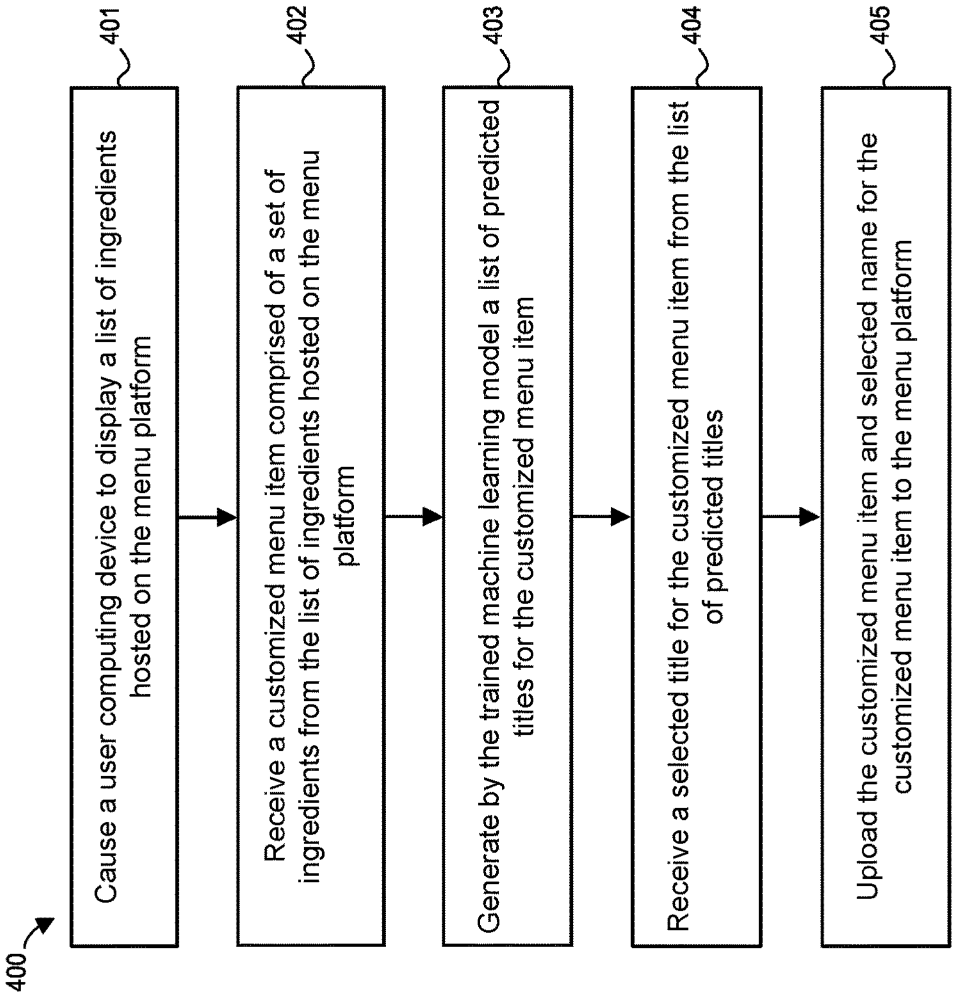
FIG. 4 illustrates an example method for dissemination of a customized menu item on the menu platform and providing predicted titles for the customized menu items, in accordance with various embodiments described herein.

FIG. 4 illustrates an example method 400 for allowing a user to create a customized menu item on the menu platform for viewing by other users accessing the menu platform, in accordance with various embodiments described herein. At least portions of the method 400 may be performed by one or more processors (e.g., processors 111, 122) utilizing the embodiments of the central server 110 and/or the user computing device 120 of FIG. 1A, for example, and/or by other suitable modules or systems, as described herein.

At block 401, the method 400 includes causing a user computing device to display a list of ingredients hosted on the menu platform. The method 400 further includes receiving a customized menu item comprised of a set of ingredients from the list of ingredients hosted on the menu platform (block 402). The method 400 further includes generating by the trained ML model a list of predicted titles for the customized menu item (block 403). The method 400 further includes receiving a selected title for the customized menu item from the list of predicted titles (block 404). The method 400 further includes uploading the customized menu item and selected name for the customized menu item to the menu platform (block 405).

In certain embodiments, the method 400 may further include uploading the customized menu item to the menu platform by: checking that the set of ingredients in the specific sequence is unavailable on the menu platform and that selected title is not included in the list of predicted titles. Further, the method 400 may include responsive to determining that the selected title is not included as part of the list of predicted titles, determining, by the one or more processors executing an NLP model, whether the selected title satisfies a menu item threshold.

Figure 5:
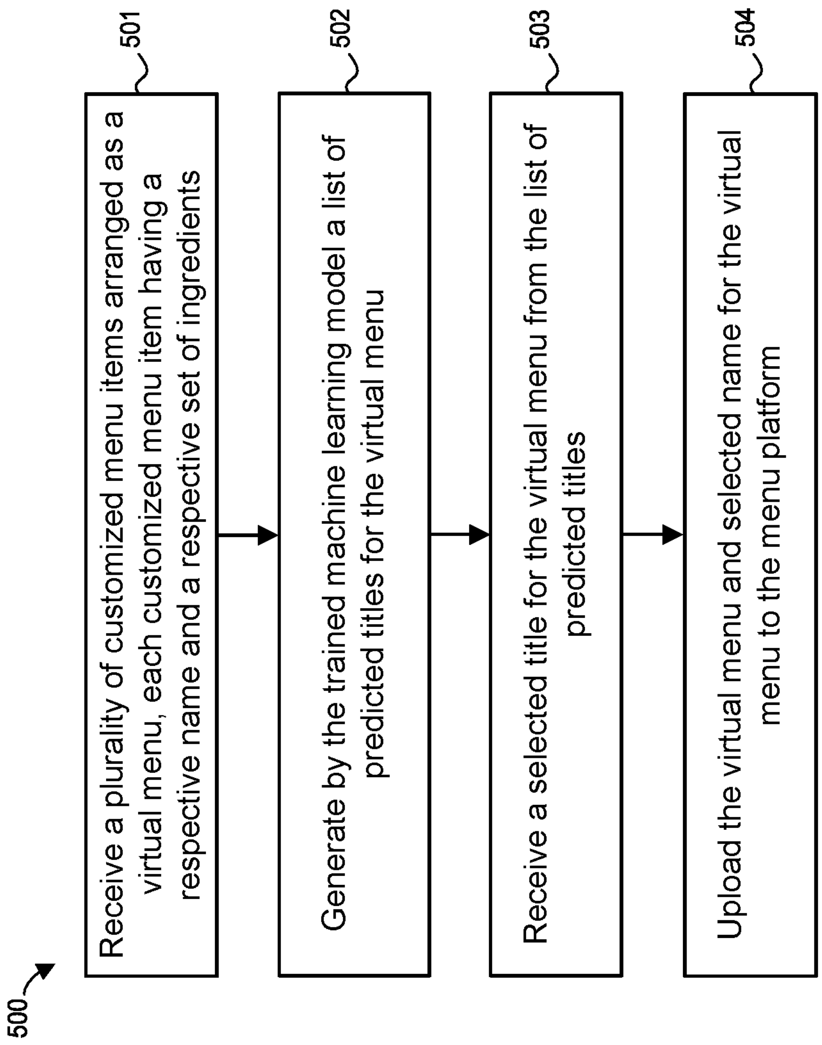
FIG. 5 illustrates an example method for dissemination of a virtual menu on the menu platform and providing predicted titles for the virtual menu, in accordance with various embodiments described herein.

FIG. 5 illustrates an example method 500 for allowing a user to create a virtual menu on the menu platform for viewing by other users accessing the menu platform, in accordance with various embodiments described herein. At least portions of the method 500 may be performed by one or more processors (e.g., processors 111, 122) utilizing the embodiments of the central server 110 and/or the user computing device 120 of FIG. 1A, for example, and/or by other suitable modules or systems, as described herein.

At block 501, the method 500 includes receiving a plurality of customized menu items arranged as a virtual menu. Each customized menu item may have a respective name and a respective set of ingredients. The method 500 further includes generating by the trained ML model a list of predicted titles for the virtual menu (block 502). The method 500 further includes receiving a selected title for the virtual menu from the list of predicted titles (block 503). The method 500 further includes uploading the virtual menu and the selected name for the virtual menu to the menu platform (block 504).

In certain embodiments, the method 500 may further include uploading the virtual menu to the menu platform by: checking that the selected title is not included as part of the list of predicted titles. Further, the method 500 may include responsive to determining that the selected title is not included as part of the list of predicted titles, determining, by executing an NLP model, whether the selected title satisfies a virtual menu title threshold.

It should be appreciated that any of the methods 300, 400, 500 may include additional or alternate steps other than those described herein. Further, any of the steps/actions of the methods 300, 400, 500 may be performed in any suitable order and/or any suitable number of times in order to reach the intended result of the methods 300, 400, 500, as described herein.

ADDITIONAL CONSIDERATIONS

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing a dynamically curated menu via machine learning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It should be understood that, unless a term is expressly defined in this patent application using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

What is claimed is:

1. A system for dynamically curating a menu, the system comprising:

one or more processors; and a non-transitory computer-readable memory coupled to the one or more processors storing a trained machine learning (ML) model and instructions thereon that, when executed by the one or more processors, cause the one or more processors to:

receive categorical data associated with a user accessing a menu platform, generate, by the trained ML model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus, update a condensed categorical dataset stored on the menu platform with the categorical data associated with the user, wherein the condensed categorical dataset stores categorical data from a plurality of users in a smaller file size than a summation of individual file sizes of the categorical data from the plurality of users, delete the categorical data associated with the user from the menu platform, transmit a control instruction causing a user computing device to display the curated menu for the user, and update the trained ML model based on the condensed categorical dataset.

2. The system of claim 1, wherein the instructions, when executed, further cause the one or more processors to:

receive, from a second user computing device, a customized menu item comprised of a set of ingredients from an ingredient list hosted on the menu platform, wherein the set of ingredients is in a specific sequence;

generate, by the trained ML model, a list of predicted titles for the customized menu item based upon categorical data of a second user using the second user computing device and the set of ingredients;

receive, a selected title for the customized menu item from the list of predicted titles; and upload, the customized menu item to the menu platform by:

checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

3. The system of claim 1, wherein the user is a first user accessing the menu platform, the curated menu is a first curated menu, the user computing device is a first user computing device, and the instructions, when executed, further cause the one or more processors to:

receive, categorical data associated with a second user accessing the menu platform;

generate, by the trained ML model, a second curated menu, wherein the second curated menu is different from the first curated menu; and cause, a second user computing device to display the second curated menu for the second user.

4. The system of claim 1, wherein the curated menu is a preliminary curated menu, and the instructions, when executed, further cause the one or more processors to:

receive subsequent categorical data associated with a user;

generate, by executing the trained ML model, a subsequent curated menu for the user, wherein the subsequent curated menu is different from the preliminary curated menu; and cause the user computing device to display the subsequent curated menu for the user.

5. The system of claim 1, wherein the instructions, when executed, further cause the one or more processors to:

receive menu item interaction data for each menu item uploaded to the menu platform; and update the trained ML model based on the menu item interaction data.

6. The system of claim 1, wherein the instructions, when executed, further cause the one or more processors to generate the curated menu for the user by:

ranking, by executing the trained ML model, each menu item included as part of the curated menu based on (i)

the categorical data and (ii) menu item interaction data corresponding to each menu item included as part of the curated menu.

7. The system of claim 1, wherein the instructions, when executed, further cause the one or more processors to:

analyze, by executing the trained ML model, the categorical data of a user and one or more menu items uploaded to the menu platform to generate a new menu item to be included as part of the curated menu, the new menu item being different from each menu item uploaded to the menu platform.

8. The system of claim 1, wherein the categorical data includes: (i) a location of the user, (ii) one or more user preferences of other users accessing the menu platform, (iii) demographic data of the user, (iv) geographic data associated with the user, (v) user preferences determined by a survey, (vi) one or more previously purchased menu items of the user, (vii) a menu item created by the user.

9. The system of claim 1, wherein the instructions, when executed, further cause the one or more processors to:

receive a plurality of customized menu items from a second user computing device arranged as a virtual menu, each customized menu item having a respective title, a respective sequence of ingredients, and each being created by a second user;

generate, by executing the trained ML model, a list of predicted titles for the virtual menu based upon (i) the respective title of each customized menu item, (ii) the respective sequence of ingredients and (iii) a second set of categorical data associated with the second user;

receive a selected title for the virtual menu from the list of predicted titles; and upload the virtual menu to the menu platform by:

checking that the selected title is not included as part of the list of predicted titles, and responsive to determining that the selected title is not included as part of the list of predicted titles, determining, by executing a natural language processing (NLP) model, whether the selected title satisfies a virtual menu title threshold.

10. A computer-implemented method for dynamically curating a menu, the computer-implemented method comprising:

receiving, by one or more processors, categorical data associated with a user accessing a menu platform;

generating, by the one or more processors executing a trained machine learning (ML) model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus;

updating, by the one or more processors, a condensed categorical dataset stored on the menu platform with the categorical data associated with the user, wherein the condensed categorical dataset stores categorical data from a plurality of users in a smaller file size than a summation of individual file sizes of the categorical data from the plurality of users;

deleting, by the one or more processors, the categorical data associated with the user from the menu platform;

causing, by the one or more processors, a user computing device to display the curated menu for the user; and updating, by the one or more processors, the trained ML model based on the condensed categorical dataset.

11. The computer-implemented method of claim 10, further comprising:

receiving, at the one or more processors from a second user computing device, a customized menu item comprised of a set of ingredients from an ingredient list hosted on the menu platform, wherein the set of ingredients is in a specific sequence;

generating, by the one or more processors executing the trained ML model, a list of predicted titles for the customized menu item based upon categorical data of a second user using the second user computing device and the set of ingredients;

receiving, at the one or more processors, a selected title for the customized menu item from the list of predicted titles; and uploading, by the one or more processors, the customized menu item to the menu platform by:

checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

12. The computer-implemented method of claim 10, wherein the user is a first user accessing the menu platform, the curated menu is a first curated menu, the user computing device is a first user computing device, and the computer-implemented method further comprises:

receiving, by the one or more processors, categorical data associated with a second user accessing the menu platform;

generating, by the one or more processors executing the trained ML model, a second curated menu, wherein the second curated menu is different from the first curated menu; and causing, by the one or more processors, a second user computing device to display the second curated menu for the second user.

13. A tangible, non-transitory computer-readable medium storing instructions for dynamically curating a menu, that when executed by one or more processors cause the one or more processors to at least:

receive, categorical data associated with a user accessing a menu platform;

generate, by a trained ML model using the categorical data as inputs, a curated menu for the user, wherein the trained ML model is trained using (i) a set of training categorical data from a plurality of users accessing the menu platform and (ii) a set of training menu items uploaded to the menu platform as inputs to output a set of training curated menus;

update a condensed categorical dataset stored on the menu platform with the categorical data associated with the user, wherein the condensed categorical dataset stores categorical data from a plurality of users in a smaller file size than a summation of individual file sizes of the categorical data from the plurality of users;

delete the categorical data associated with the user from the menu platform, transmit a control instruction causing a user computing device to display the curated menu for the user; and update the trained ML model based on the condensed categorical dataset.

14. The tangible, non-transitory computer-readable medium of claim 13, wherein the instructions, when executed, further cause the one or more processors to at least:

receive, from a second user computing device, a customized menu item comprised of a set of ingredients from an ingredient list hosted on the menu platform, wherein the set of ingredients is in a specific sequence;

generate, by the trained ML model, a list of predicted titles for the customized menu item based upon categorical data of a second user using the second user computing device and the set of ingredients;

receive, a selected title for the customized menu item from the list of predicted titles; and upload, the customized menu item to the menu platform by:

checking that the set of ingredients in the specific sequence is unavailable on the menu platform and that selected title is not included in the list of predicted titles, and responsive to determining that the selected title is not included as part of the list of predicted titles, determining, by the one or more processors executing a natural language processing (NLP) model, whether the selected title satisfies a menu item threshold.

15. The tangible, non-transitory computer-readable medium of claim 13, wherein the curated menu is a preliminary curated menu, and wherein the instructions, when executed, further cause the one or more processors to at least:

receive, subsequent categorical data associated with a user;

generate, by the trained ML model, a subsequent curated menu for the user, wherein the subsequent curated menu is different from the preliminary curated menu; and cause, the user computing device to display the subsequent curated menu for the user.

16. The tangible, non-transitory computer-readable medium of claim 15, wherein the instructions, when executed, further cause the one or more processors to at least:

receive, menu item interaction data for each menu item uploaded to the menu platform; and update, the trained ML model based on the menu item interaction data.

17. The tangible, non-transitory computer-readable medium of claim 13, wherein the instructions, when executed, further cause the one or more processors to at least:

analyze, by the trained ML model, the categorical data of a user and one or more menu items uploaded to the menu platform to generate a new menu item to be included as part of the curated menu, the new menu item being different from each menu item uploaded to the menu platform.

18. The tangible, non-transitory computer-readable medium of claim 13, wherein the instructions, when executed, further cause the one or more processors to at least:

receive, a plurality of customized menu items from a second user computing device arranged as a virtual menu, each customized menu item having a respective title, a respective sequence of ingredients, and each being created by a second user;

generate, by the trained ML model, a list of predicted titles for the virtual menu based upon (i) the respective title of each customized menu item, (ii) the respective sequence of ingredients and (iii) a second set of categorical data associated with the second user;

receive, a selected title for the virtual menu from the list of predicted titles;

upload, the virtual menu to the menu platform by:

checking that the selected title is not included as part of the list of predicted titles; and responsive to determining that the selected title is not included as part of the list of predicted titles, determining, by the one or more processors executing a natural language processing (NLP) model, whether the selected title satisfies a virtual menu title threshold.

* * * * *